United States Patent
Uchida et al.

(10) Patent No.: US 12,462,400 B2
(45) Date of Patent: Nov. 4, 2025

(54) OBJECT TRACING APPARATUS, METHOD FOR SAME, AND NON-TRANSITORY COMPUTER-READABLE STORAGE MEDIUM

(71) Applicant: CANON KABUSHIKI KAISHA, Tokyo (JP)

(72) Inventors: Yumiko Uchida, Kanagawa (JP); Yusuke Mitarai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 18/186,233

(22) Filed: Mar. 20, 2023

(65) Prior Publication Data
US 2023/0326040 A1 Oct. 12, 2023

(30) Foreign Application Priority Data

Apr. 8, 2022 (JP) ................................ 2022-064647

(51) Int. Cl.
*G06T 7/246* (2017.01)
(52) U.S. Cl.
CPC .... *G06T 7/246* (2017.01); *G06T 2207/10016* (2013.01); *G06T 2207/30196* (2013.01)
(58) Field of Classification Search
CPC ........... G06T 7/246; G06T 2207/10016; G06T 2207/30196; G06T 2207/30241; G06T 2207/30232
See application file for complete search history.

(56) References Cited

U.S. PATENT DOCUMENTS

| | | | |
|---|---|---|---|
| 9,697,441 B2 | 7/2017 | Mitarai et al. | |
| 2015/0146010 A1* | 5/2015 | Yokozeki | G01S 3/7864 |
| | | | 348/169 |
| 2017/0206431 A1 | 7/2017 | Sun | |

(Continued)

FOREIGN PATENT DOCUMENTS

| | | | |
|---|---|---|---|
| JP | 2019-185615 A | 10/2019 | |
| JP | 2019185615 | * 10/2019 | ............. G06T 7/292 |
| JP | 6833617 B2 | 2/2021 | |

OTHER PUBLICATIONS

Wojke et al., "Simple online and realtime tracking with a deep association metric" IEEE International Conference in Image Processing, Mar. 2017, pp. 3645-3649) (Year: 2017).*

(Continued)

*Primary Examiner* — Amara Abdi
(74) *Attorney, Agent, or Firm* — Carter, DeLuca & Farrell LLP

(57) ABSTRACT

This invention provides an object tracing apparatus that traces an object in a video obtained by an image capturing apparatus, comprising a tracking unit that tracks the object in a frame in the video and obtains track data indicating consecutive appearances of the object, and a tracing unit that generates trace information indicating which object ID each track ID belongs to, by associating a track ID obtained via tracking by the tracking unit with an object ID for uniquely identifying an object, wherein the tracing unit, on a basis of a coexistence possibility relating to imaging time between a track ID associated with one or more existing object IDs and target track data without an associated object ID, determines which object ID the target track data belongs to.

9 Claims, 16 Drawing Sheets

(56) References Cited

U.S. PATENT DOCUMENTS

2018/0342071 A1* 11/2018 Shibata ............... G06F 18/2411
2020/0097501 A1* 3/2020 Matsubara ............. G06F 16/75
2021/0237768 A1* 8/2021 Tateishi ............. B60W 60/001
2021/0281748 A1 9/2021 Nogami et al.

OTHER PUBLICATIONS

Wojke, N. et al., "Simple online and realtime tracking with a deep association metric" IEEE International Conference on Image Processing(ICIP), arXiv:1703.07402v1 (Mar. 2017) pp. 3645-3649.

* cited by examiner

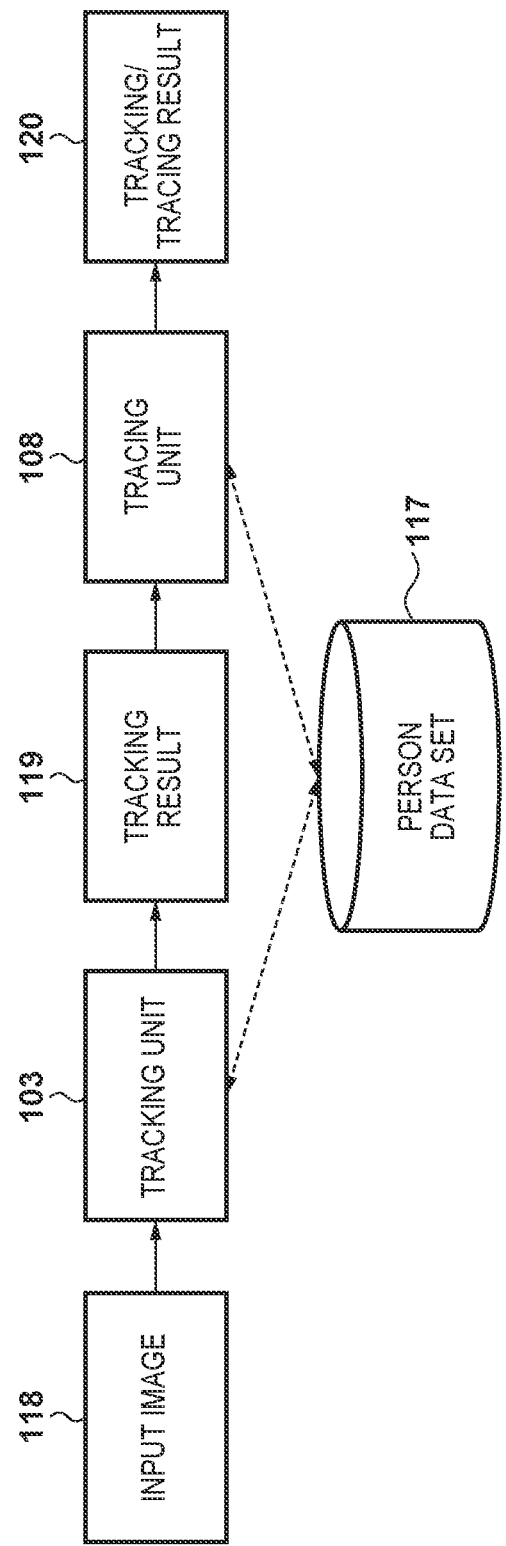

FIG. 3A

| TRACK ID | DETECTION BOX LIST | TRACKING IN PROGRESS INFORMATION |
|---|---|---|
| 1 | [x1, y1, w1, h1, feature1, time1]<br>[x2, y2, w2, h2, feature2, time2]<br>[x3, y3, w3, h3, feature3, time3]<br>: | 1 |
| 2 | [x4, y4, w4, h4, feature4, time1]<br>[x5, y5, w5, h5, feature5, time3]<br>[x6, y6, w6, h6, feature6, time4]<br>: | 0 |
| 3 | : | |

FIG. 3B

| PERSON ID | TRACK ID LIST |
|---|---|
| 1 | 1, 3, 4 ··· |
| 2 | 2, 6 ··· |
| 3 | : |

FIG. 3C

| DETECTION BOX | TRACK ID |
|---|---|
| [x7, y7, w7, h7, feature7, time5] | 1 |
| [x8, y8, w8, h8, feature8, time5] | 7 |
| [x9, y9, w9, h9, feature9, time5] | 10 |

FIG. 3D

| DETECTION BOX | TRACK ID | PERSON ID | PERSON ID CORRECTION INFORMATION |
|---|---|---|---|
| [x7, y7, w7, h7, feature7, time5] | 1 | 1 | 0 |
| [x8, y8, w8, h8, feature8, time5] | 7 | -1 | 0 |
| [x9, y9, w9, h9, feature9, time5] | 10 | -1 | 1 |

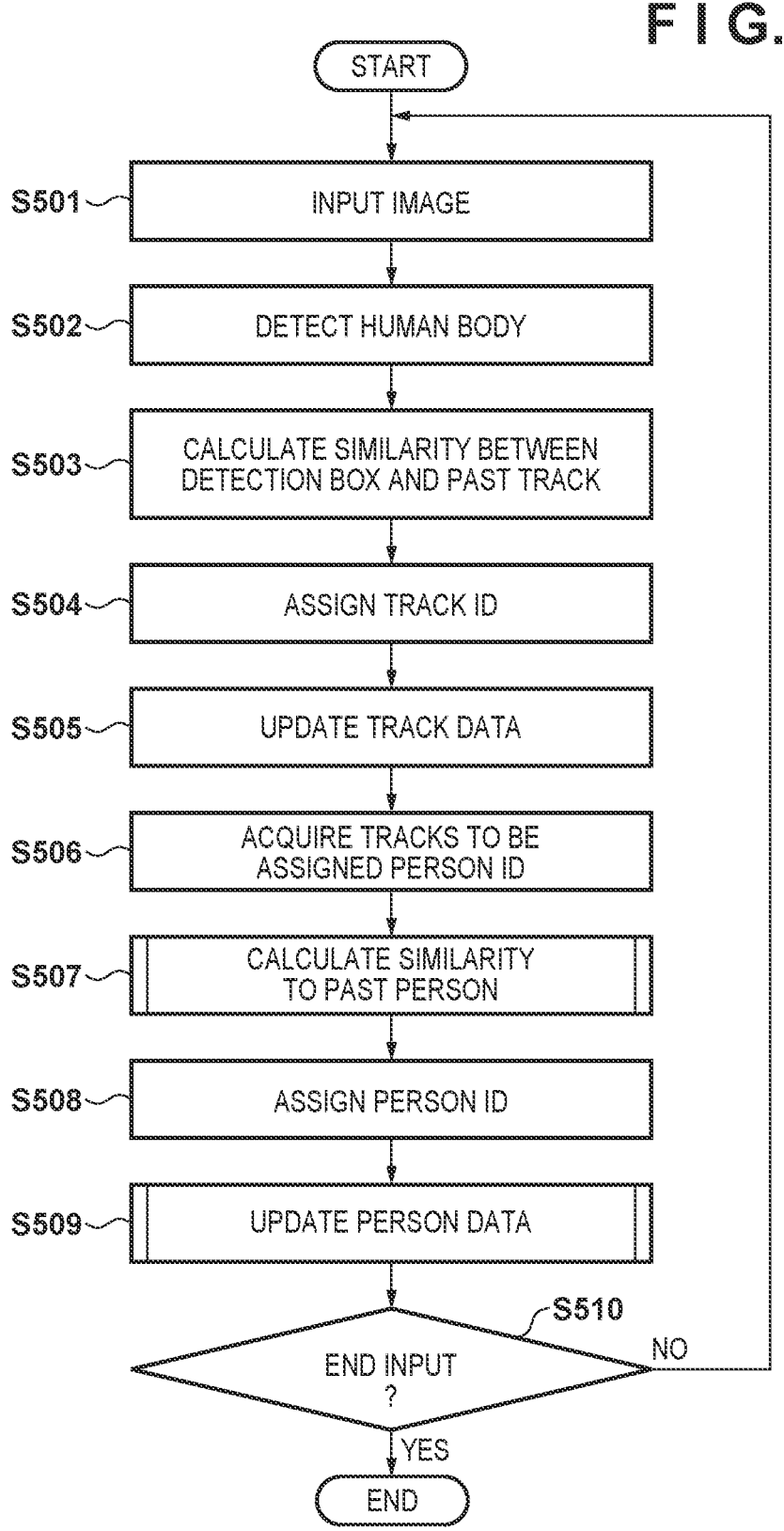

FIG. 7A
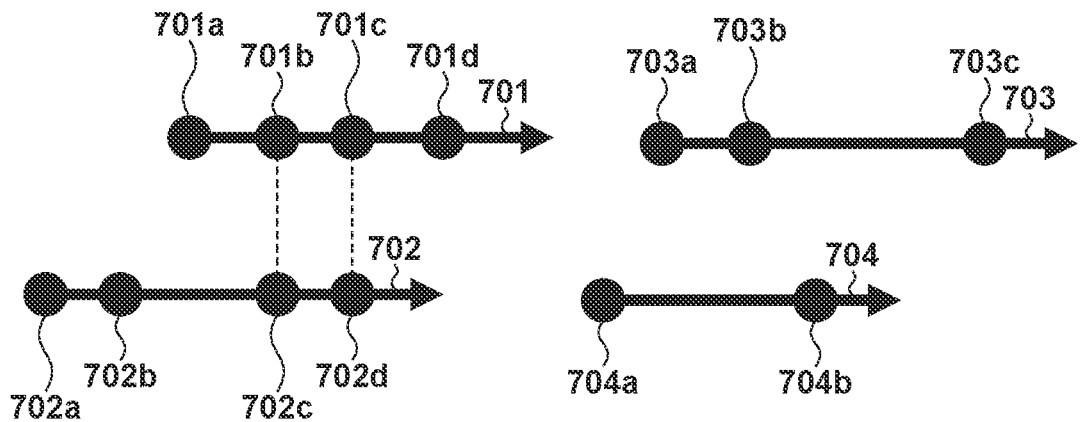
FIG. 7B
FIG. 8A
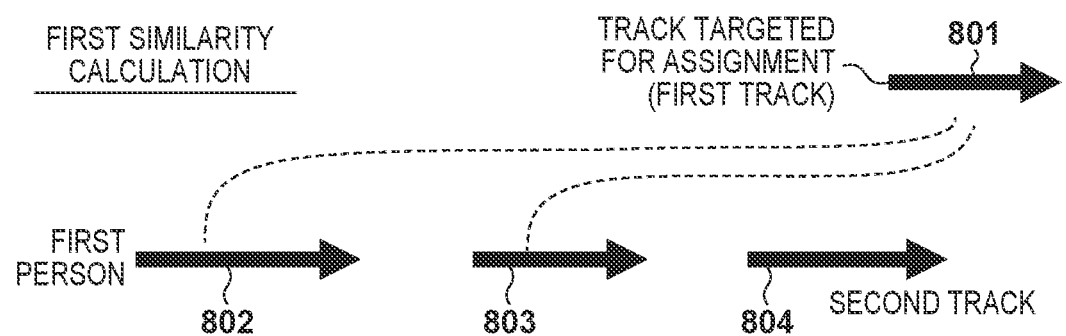
FIG. 8B
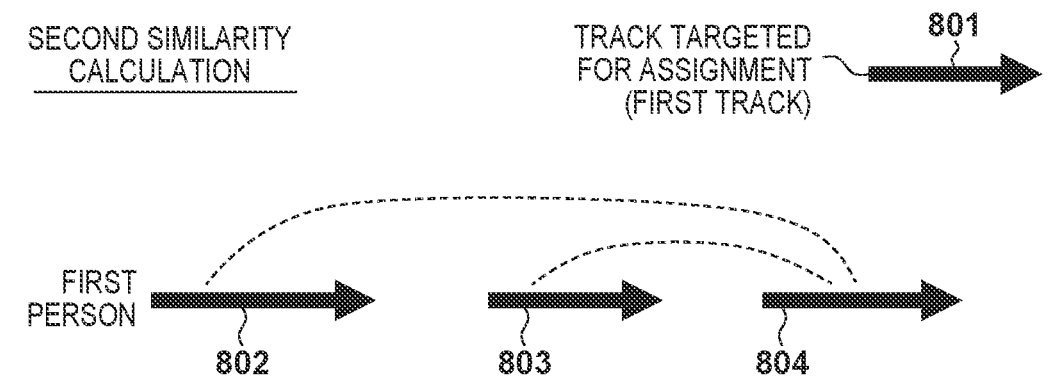

OBJECT TRACING APPARATUS, METHOD FOR SAME, AND NON-TRANSITORY COMPUTER-READABLE STORAGE MEDIUM

BACKGROUND OF THE INVENTION

Field of the Invention

The present invention relates to an object tracing apparatus, method for same, and non-transitory computer-readable storage medium.

Description of the Related Art

A technique for obtaining a movement trajectory of the same person from video captured by a single camera is an example of a people tracking technique that is widely used. With a typical person tracking technique, when a person being tracked disappears for a long period of time or goes in and out from the screen, the movement trajectory is problematically interrupted. Also, the movement trajectory of a person shown in a plurality of camera videos cannot be obtained.

A technique gaining momentum to solve these problems includes analyzing the movement trajectory obtained from one camera or a plurality of cameras and merging the movement trajectories of a person inferred to be the same person.

In the method described in PTL 1 and PTL 2, the movement trajectory of the same person is determined by resolving inconsistencies in the movement trajectories obtained from a plurality of cameras. In PTL 1, a movement trajectory group of the same person is generated by sequentially merging two movement trajectories. When looking at the possible merged patterns, if a plurality of movement trajectories from the same camera exist at the same time, it is determined that there is inconsistency in the merging result, and inconsistency resolving processing is executed. The inconsistency resolving processing includes repeatedly executing processing to unmerge merging in order from movement trajectories with low similarity until the inconsistency is resolved.

In PTL 2, after the merging of movement trajectories in a camera, the movement trajectories between cameras are merged. When merging the movement trajectories between cameras, the movement trajectories with the closest feature amounts are not simply determined to be that of the same person but are instead associated to obtain overall conformity in combination. Specifically, a clustering method is used in which, under the premise that the movement trajectories in the camera have been correctly merged, a restriction is added that the movement trajectories shown in the same camera are not determined to be of the same person.

CITATION LIST

PTL 1: Japanese Patent Laid-Open No. 2019-185615
PTL 2: Japanese Patent No. 6833617
PTL 3: US-2017-0206431
NPL 1: Simple online and realtime tracking with a deep association metric, Nicolai Wojke, Alex Bewley, and Dietrich Paulus, IEEE International Conference on Image Processing (ICIP), pp. 3645-3649, 2017.

In PTL 1, only the similarity between two movement trajectories is taken into account when resolving inconsistency. Thus, inconsistency removal processing for the movement trajectories of one person cannot be executed. PTL 2 is premised on the movement trajectories in the same camera being correctly merged, and thus cannot resolve an inconsistency in the merging of movement trajectories in the same camera.

SUMMARY OF THE INVENTION

The present invention has been made in consideration of the aforementioned problems and realizes a technique for tracing a target object with higher accuracy by taking into consideration the coexistence possibility for movement trajectories of the target object obtained from video and associating together the target object and the movement trajectories.

According to a first aspect of the invention, there is provided an object tracing apparatus that traces an object in a video obtained by an image capturing apparatus, comprising: a processor; and a memory storing instructions which, when read and executed by the processor, causes the object tracing apparatus function as: a tracking unit that tracks the object in a frame in the video and obtains track data indicating consecutive appearances of the object, wherein, the tracking unit detects a region of the object in a target frame in the video and assigns a new track ID to the region detected from the target frame when the region is not a region subsequent to a region detected in a previous frame to the target frame, and when the region detected from the target frame is a region subsequent to the region detected in the previous frame, a track ID identical to that of the region corresponding to the previous frame is assigned to the region detected from the target frame to obtain track data indicating a consecutive appearance of an identical object; and a tracing unit that generates trace information indicating which object ID each track ID belongs to, by associating a track ID obtained via tracking by the tracking unit with an object ID for uniquely identifying an object, wherein the tracing unit on a basis of a coexistence possibility relating to imaging time between a track ID associated with one or more existing object IDs and target track data without an associated object ID, determines which object ID the target track data belongs to.

According to a second aspect of the invention, there is provided a method of controlling an object tracing apparatus that traces an object in a video obtained by an image capturing apparatus, comprising: (a) tracking the object in a frame in the video and obtains track data indicating consecutive appearances of the object, wherein, the tracking (a) includes (a-1) detecting a region of the object in a target frame in the video and assigning a new track ID to the region detected from the target frame when the region is not a region subsequent to a region detected in a previous frame to the target frame, and (a-2) when the region detected from the target frame is a region subsequent to the region detected in the previous frame, assigning a track ID identical to that of the region corresponding to the previous frame to the region detected from the target frame to obtain track data indicating a consecutive appearance of an identical object; and (b) generating trace information indicating which object ID each track ID belongs to, by associating a track ID obtained in the tracking with an object ID for uniquely identifying an object, wherein the generating (b) on a basis of a coexistence possibility relating to imaging time between a track ID associated with one or more existing object IDs and target track data without an associated object ID, determines which object ID the target track data belongs to.

According to a third aspect of the invention, there is provided a non-transitory computer readable storage medium storing a program which, when read and executed by a computer, caused the computer to perform the steps of a method of controlling an object tracing apparatus that traces an object in a video obtained by an image capturing apparatus, the method comprising: (a) tracking the object in a frame in the video and obtains track data indicating consecutive appearances of the object, wherein, the tracking (a) includes (a-1) detecting a region of the object in a target frame in the video and assigning a new track ID to the region detected from the target frame when the region is not a region subsequent to a region detected in a previous frame to the target frame, and (a-2) when the region detected from the target frame is a region subsequent to the region detected in the previous frame, assigning a track ID identical to that of the region corresponding to the previous frame to the region detected from the target frame to obtain track data indicating a consecutive appearance of an identical object; and (b) generating trace information indicating which object ID each track ID belongs to, by associating a track ID obtained in the tracking with an object ID for uniquely identifying an object, wherein the generating (b) on a basis of a coexistence possibility relating to imaging time between a track ID associated with one or more existing object IDs and target track data without an associated object ID, determines which object ID the target track data belongs to.

According to the present invention, an object can be traced with a higher according to by taking into consideration the coexistence possibility for movement trajectories of the object obtained from video and associating together the object and the movement trajectories.

Further features of the present invention will become apparent from the following description of exemplary embodiments with reference to the attached drawings.

BRIEF DESCRIPTION OF THE DRAWINGS

FIGS. 1A and 1B are system configuration diagrams according to a present embodiment.

FIGS. 3A to 3D are diagrams of the data format according to the present embodiment.

FIG. 5 is a flowchart of the overall processing according to a first embodiment.

FIGS. 7A and 7B are explanatory diagrams of a coexistence possibility determination method for TRACKs according to the first embodiment.

FIGS. 8A and 8B are diagrams illustrating the similarity calculation method according to the first embodiment.

DESCRIPTION OF THE EMBODIMENTS

Figure 1A:
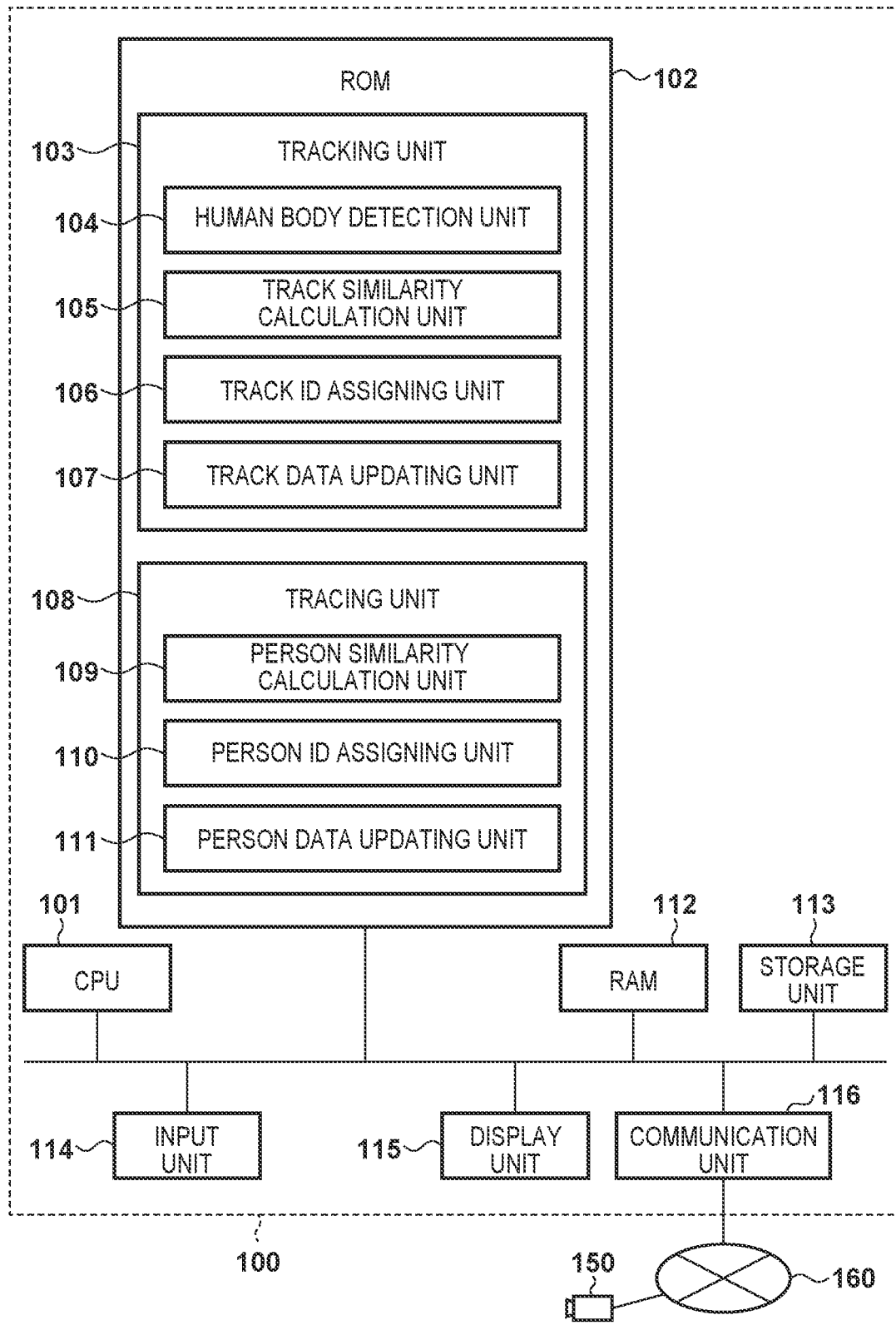

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A person tracing apparatus described in the present embodiment is configured to acquire a movement trajectory of a person in a video captured by a network camera or the like. The present embodiment is an example in which the movement trajectory of the same person is acquired from the video from one camera.

In the present embodiment, data representing a short-term movement trajectory of a person in a video is referred to as a "TRACK", and the processing to acquire a TRACK is referred to as "tracking". Also, forming one TRACK by joining together two TRACKs of the same person and the processing to acquire a long-term movement path of a person is referred to as "tracing". Note that the difference between tracking and tracing will be described below using FIG. 2.

FIG. 1A is a hardware configuration diagram of an image processing apparatus 100 according to the present embodiment. A CPU 101 controls the entire apparatus by executing a control program stored in a ROM 102. The control program stored in the ROM 102 is constituted by, broadly speaking, a tracking unit 103 and a tracing unit 108. The tracking unit 103 is a program for executing processing to acquire a TRACK and is constituted by a human body detection unit 104, a track similarity calculation unit 105, a track ID assigning unit 106, and a track data updating unit 107. The tracing unit 108 is a program for executing processing to acquire a movement path of TRACKs joined together and is constituted by a person similarity calculation unit 109, a person ID assigning unit 110, and a person data updating unit 111.

A RAM 112 temporarily stores various types of data. Also, the RAM 112 is used for loading the program executed by the CPU 101.

A storage unit 113 is configured to store the data (person data set and the like described below) used in the processing of the present invention and store the data used by the tracking unit 103 and the tracing unit 108. Examples of mediums that can be used as the storage unit 113 include HDD, flash memory, various types of optical media, and the like.

An input unit 114 is constituted by a keyboard, touch panel, or the like and is configured to accept an input from a user and receive a start or end trace instruction or the like. A display unit 115 is constituted by a liquid crystal display or the like and can display various types of data and processing results to the user.

Also, a communication unit 116 is an interface for communicating with an external apparatus. The communication unit 116 according to this embodiment is an interface for connecting to a network 160. Also, the external apparatus the communication unit 116 communicates with corresponds to a network camera 150. Note that the communication unit 116 may communicate via a wired or wireless connection. Also, the network camera 150 is configured to capture images at 30 frames per second, for example. Furthermore, the communication unit 116 may an interface (for example, a USB interface) for connecting directly to an external camera and not a network interface.

FIG. 1B is a data flow diagram according to the present apparatus. First, the communication unit 116 sequentially receives images captured by the network camera 150 as input images 118 via the network 160.

The tracking unit 103 detects regions showing an object in the input images 118, that is the video from the network camera 150, and assigns a track ID to each detected region. At this time, the tracking unit 103 assigns the same track ID to regions continuously showing the same person. Specifically, the tracking unit 103 references a person data set 117 storing TRACK data, determines which TRACK to appropriately associate each detected region with, and outputs the result as a tracking result 119. The tracking result 119 is added to the person data set 117.

Note that to describe the tracking unit 103 according to this embodiment in further detail, the tracking unit 103 detects a person shown in the current frame (or in a target frame) of the input images 118 (in this process, the feature amount of the person is calculated) and detects a box (hereinafter referred to as a detection box) indicating the region showing the person. Note that the detection box according to this embodiment corresponds to a bounding rectangle region showing the person but may correspond to a bounding rectangle resized by a preset percentage. Also, the detection box detected from the current frame with the track ID unassigned is defined as a target detection box. The tracking tracing-unit 103 determines the similarity between the position, size, and feature amount of the detection box (or a plurality of detection boxes) detected from the preceding frame stored in the person data set 117 and the position, size, and feature amount of the target detection box as an argument. The frame rate of the network camera 150 according to this embodiment is 30 FPS. The change in distance and orientation able to be enacted by a person in a short period of time such as $\frac{1}{30}$th of a second can be considered to be sufficient small. Thus, including the position and size of the detection box in the argument obtained when determining the similarity can be considered logical. However, to reduce the time taken for the operation, the position or the size of the detection box may be omitted. When detection boxes with a similarity equal to or greater than a threshold exist among the detection boxes of the preceding frame, the tracking unit 103 determines that the target detection box belongs to the track ID assigned to the detection box with the highest similarity. In this manner, the same ID can be assigned to the same person across consecutive frames. Note that there may a case in which not even one detection box with a similarity equal to or greater than the threshold exists among the detection boxes detected from the preceding frame. In this case, the tracking unit 103 generates a new track number for the target detection box.

The tracing unit 108 receives the tracking result 119 described above from the tracking unit 103. Then, the tracing unit 108 generates trace information in which a person ID for uniquely identifying persons is assigned to the TRACK included in the tracking result 119. In addition to the track data, the person information is also stored in the person data set 117. The tracing unit 108 determines which person to appropriately associate each TRACK with and outputs the result, that is a tracking and tracing result 120, as trace information.

Figure 2A:
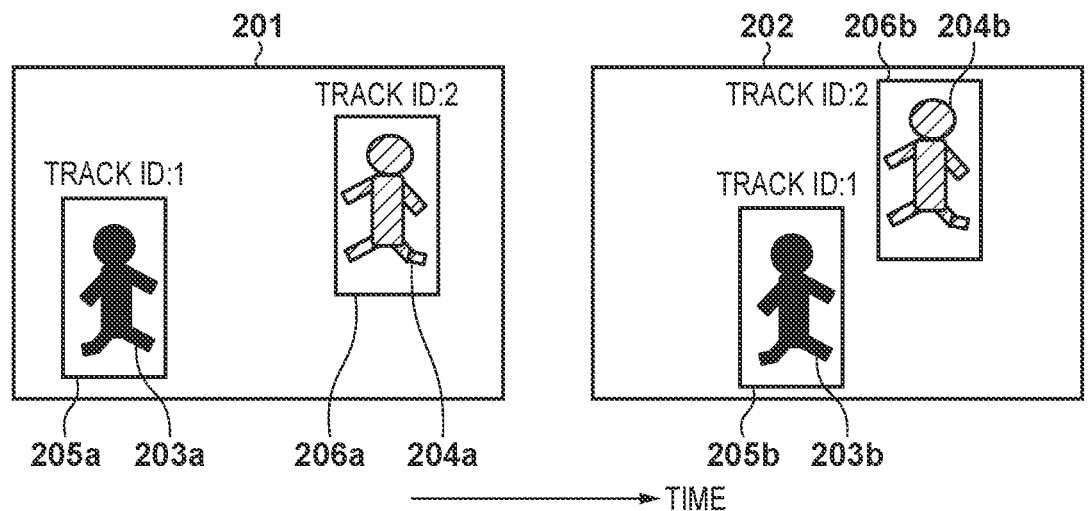
FIGS. 2A and 2B are diagrams outlining tracking and tracing.

FIG. 2A is a diagram illustrating an example of tracking in a video from one camera. An image 201 and an image 202 are images captured by the same camera at consecutive times. In this example, the image 202 is an image captured later in time than the image 201. In the images 201 and 202, a person 203 and a person 204 are shown in the images. A detection box 205a and a detection box 206a are output as detected regions corresponding to a person 203a and a person 204a in the image 201. In a similar manner, a detection box 205b and a detection box 206b are output as detected regions corresponding to a person 203b and a person 204b in the image 202. Tracking processing includes assigning the same track ID to frames inferred to be the same person across images. In the present example, a track ID of 1 is assigned to the detection box 205a and the detection box 205b corresponding to the person 203, and a track ID of 2 is assigned to the detection box 206a and the detection box 206b corresponding to the person 204. Note that in the present embodiment, a rectangle is used for the human body detected region. The rectangles may be simply bounding rectangle of a region indicating a human body or may be rectangles obtained by enlarging the bounding rectangle to a predetermined size. Alternatively, a polygon with more vertices or a circle may be used for the human body detected region.

Figure 2B:
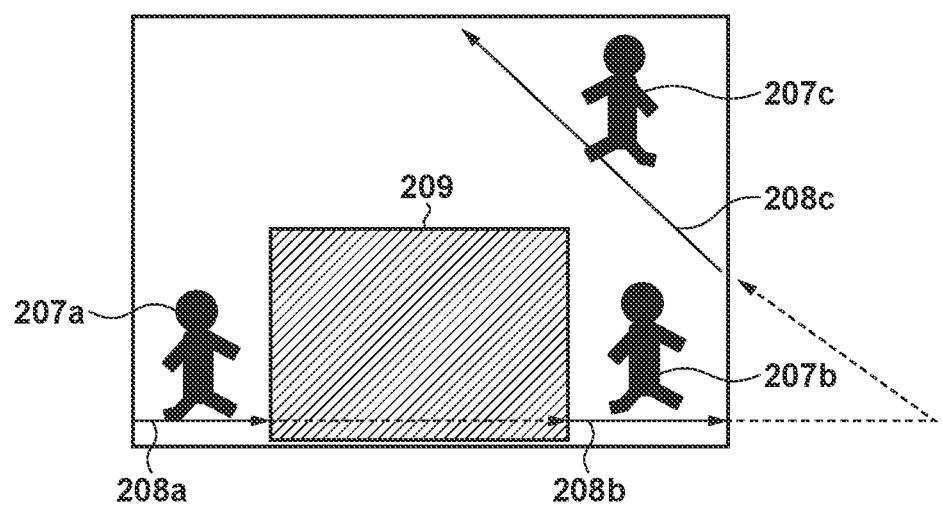

FIG. 2B is a diagram illustrating an example of the tracking and tracing of one person in a video from one camera. In the present example, a person 207 is moving within the screen, and persons 207a to 207c represent the positions where the person 207 appears at different imaging times.

First, tracking processing is executed on the person 207a that has moved in from the left edge of the screen, and a corresponding TRACK 208a is acquired. Thereafter, the person 207 disappears behind a cover 209 and is no longer shown in the video. When this state of not showing in the video continues for a certain amount of time, the TRACK is considered to be in an interrupted state, and even if the same person appears again, tracking is executed as a different TRACK. This is because, when tracking, association is executed taking into account how close the appearance positions of the detection boxes are in the plurality of images, but, for a person that has not appeared for a certain amount of time, there is a high possibility that the person will have left that position when they reappear, making association difficult.

In the present example, the same person reappears as the person 207b but is tracked in the tracking processing as a TRACK 208b different from the TRACK 208a. Next, the person 207 moves outside of the screen and is not shown in the video. Thereafter, the person 207 reappears in the screen as the person 207c, and the corresponding TRACK is acquired as a TRACK 208c.

In this manner, in the tracking processing, the three independent TRACKs, the TRACKs 208a to 208c, are not determined to be the movement trajectory of the same person.

In the tracing processing, the TRACKs 208a to 208c are merged, and information in which a person ID indicating the same person is assigned to the merged TRACKs 208a to 208c is output. In the tracing processing, the TRACKs are merged on the basis of an external appearance feature independent of the position where the person appears. Thus, a person can be determined to be the same person even when the TRACKs are of different times.

Next, the data specifications according to the present embodiment will be described with reference to FIGS. 3A to 3D. FIG. 3A is a diagram illustrating the track data included in the person data set 117 which is what the tracking unit 103 references and records. For each track ID 301, a detection box list 302 and tracking in progress information 303 are managed. In the detection box list 302, the detection boxes acquired from the plurality of images are recorded together with the coordinate values (coordinates of the upper left corner of the rectangle) and the size (horizontal direction and vertical direction size) of the detection box, time information corresponding to the image which is the acquisition source, and an image feature amount acquired from the person image in the detection box. Note that when the coordinates of the four corners of the detection box are stored, the size is not necessary (the size can be calculated from the coordinates). Also, when the frame rate of the network camera 150 is known and the starting time of image capture by the network camera 150 is known, a frame number may be managed instead of the time information. The tracking in progress information 303 indicates whether the tracking is in progress or interrupted by a cover or the like. For example, this can be set to 1 when tracking is in progress and to 0 when tracking is interrupted.

FIG. 3B is a diagram illustrating the person data included in the person data set 117 which is what the tracing unit 108 references and records. For each person ID 304, a corresponding track ID list 305 is managed. For example, if we look at the person ID 1, we can see that this person appears in track ID 1, 3, and 4 in FIG. 3A.

FIG. 3C is a diagram illustrating the data of the tracking result 119. A detection box 306 detected in one image and a corresponding track ID 307 are output.

FIG. 3D is a diagram illustrating the data of the tracking and tracing result 120. As with the data of the tracking result 119, this includes a detection box 308 and a track ID 309, and, for each track ID 309, a person ID 310 is further output. In this example, a person ID of −1 indicates that the TRACK has not been assigned a person ID. In the present embodiment, the tracing processing is executed at the time when a certain number of detection boxes or more are accumulated in one TRACK. If a certain number of detection boxes have not been accumulated, the person ID is set to a non-assigned state.

Also, the person ID 310 corresponding to each track ID 309 is not limited to the correct value always been assigned. The output value of the person ID for the input images before the last and the output value of the person ID for the current input image may be inconsistent. In this case, the person ID assigned to the TRACK up until the last is corrected and returns to a non-assigned state.

Information indicating whether or not the person ID 310 corresponding to each track ID 309 has been corrected is output to person ID correction information 311. For example, this is output as 0 when there has been no correction and output as 1 when there has been a correction. In the example in FIG. 3D, the data with a track ID of 10 has had the person ID correction and been returned to a non-assigned state. Note that a specific example in which the person ID is corrected will be described below using FIG. 9.

Figure 4:
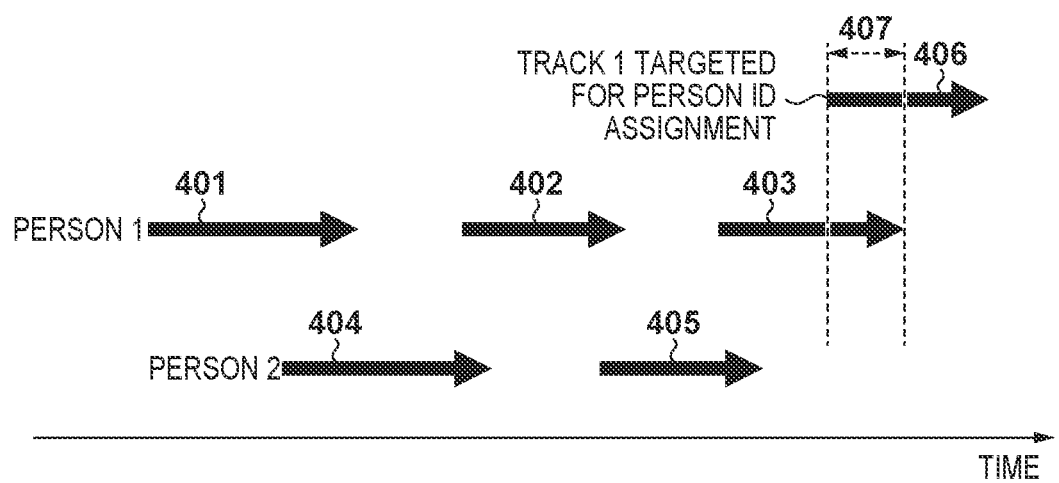
FIG. 4 is a diagram for describing inconsistency in a TRACK assignment result.

A state in which assignment of a person ID is inconsistent will now be described with reference to FIG. 4. In the example in FIG. 4, a TRACK 401, a TRACK 402, and a TRACK 403 are associated with a person 1, and a TRACK 404 and a TRACK 405 are associated with a person 2.

This data is stored in the person data set 117. Now let's consider a case in which the tracing unit 108 executes tracing processing to determine which person a TRACK 406 corresponds to. In this example, if it is assumed that the TRACK 406 belongs to the person 1, it follows that a plurality of TRACKs (the TRACKs 403 and 406 in the example in the diagram) belonging to the person 1 exist in a period 407. However, it is impossible for the same person to appear multiple times in one screen at the same time. Thus, this assumption (to assign the person ID of the person 1 to the TRACK 406) results in an inconsistency.

On the other hand, when it is assumed that the TRACK 406 corresponds to the person 2, there is no temporal overlap between the TRACK 406 and the TRACKs (the TRACKs 404 and 405 in the example in the diagram) belonging to the person 2. Thus, this assumption results in no inconsistencies.

In the present embodiment, the coexistence possibility of a plurality of TRACKs based on the same person is determined, control of processing is executed so that the ID of the same person is not assigned to TRACKs unable to coexist, and correction of existing assignment results is executed.

Next, the process of the processing by the CPU 101 of the image processing apparatus 100 according to this embodiment will be described with reference to the flowchart in FIG. 5. In the same diagram, it should be understood that the process represented by steps S501 to S505 corresponds to the processing by the tracking unit 103, and the process represented by steps S506 to S509 corresponds to the processing by the tracing unit 108.

First, in step S501, from the network camera 150, the CPU 101 receives the input images 118 which are the processing targets of the present flow via the communication unit 116. Then, in step S502, the CPU 101 executes detection of persons shown in the input images 118 and outputs detection boxes corresponding to the human body regions. The method for detecting human body regions from the images is not particularly limited, and one example that can be used is a method using the Convolutional Neural Network (CNN) described in PTL 3.

In step S503, the CPU 101 references the track data included in the person data set 117 and calculates the similarity between the detection box output in step S502 and each TRACK. In this example, from among the TRACKs in the track data, only the TRACKs with a 1 (in progress) in the tracking in progress information 303 are targets for similarity calculation referencing the data illustrated in FIG. 3B. Specifically, the image feature amount extracted from the detection box and the coordinates of the detection box and the feature amount of the TRACK in the track data and the coordinates can be used to calculate the similarity. For example, the similarity used can be based on the feature amount acquired via CNN from the detection box using the method described in NPL 1 and the position information inferred from the movement trajectory of the TRACK via Kalman filtering. When a plurality of detection boxes are output, the similarity is calculated for each detection box.

Next, in step S504, the CPU 101 assigns a track ID to the detection box. For example, a matrix is generated based on the similarity of each detection box and each TRACK and the assignment problem is solved, allowing a track ID to be assigned to the detection box. Also, when a threshold is set for the similarity and no TRACKs with a similarity equal to or greater than the threshold exist, the CPU 101 generates a new track ID for the target TRACK. The output result of step S504 corresponds to the tracking result 119. For example, the assignment method used can be the Hungarian method described in NPL 1.

In step S505, the CPU 101 updates the track data in the person data set 117. Specifically, the CPU 101 executes processing to add the result of assigning the track ID obtained in step S504 to the person data set 117. As illustrated in FIG. 3A, the track data of each track ID 301 is stored in the person data set 117. In the present step, the CPU 101 adds new detection box information to the table. Also, the CPU 101 changes the tracking in progress information 303 to 0 (interrupted state) for a TRACK not assigned a detection box after a certain period of time.

In step S506, the CPU 101 acquires a list of TRACKs to be assigned person IDs in the tracing processing. In the present embodiment, the tracing processing includes assigning person IDs to a TRACK when a predetermined number of detection boxes or more have been accumulated in one TRACK. Accordingly, in step S506, the CPU 101 determines whether the predetermined number of detection boxes in the TRACK has been accumulated for the track ID with an unassigned person ID included in the tracking result 119. Then, the CPU 101 sets the TRACK with an unassigned person ID with the predetermined number of detection boxes or more accumulated as the current TRACK targeted for person ID assignment.

In step S507, the CPU 101 references the person data included in the person data set 117 and calculates the similarity between the TRACK targeted for person ID assignment acquired in step S506 and a TRACK (not limited to being a single TRACK) whose assigned ID is among those of the people who appeared previously. The image feature amounts acquired from the detection boxes in each TRACK are used in calculating the similarity. Note that the present step is described below in detail with reference to FIGS. 6A and 6B.

In step S508, the CPU 101 assigns a person ID on the basis of the similarity calculated in step S507. In the person ID assignment processing, as in the processing executing when tracking, a matrix is generated based on the similarity of each TRACK and each person and the assignment problem is solved, allowing a person ID to be assigned to the TRACK.

Also, when a threshold is set for the similarity and no persons with a similarity equal to or greater than the threshold exist, the CPU 101 generates a new person ID. Then, the CPU 101 registers the TRACK targeted for person ID assignment as belonging to the generated person ID.

In step S509, the CPU 101 updates the person data in the person data set 117. Specifically, processing to add the result of assigning the person ID to a TRACK in step S508 to the person data set 117 is executed. The present step is described below in detail with reference to FIG. 9.

In step S510, the CPU 101 determines whether or not there is a next image input. When there is no input, the processing ends, and when there is an input, the processing returns to step S501 and the processing described above is repeated.

Next, the processing executing in step S507 in FIG. 5 to calculate the similarity between an existing person for a TRACK not assigned a person ID will be described with reference to the flowcharts in FIGS. 6A and 6B.

In step S601, the CPU 101 selects one TRACK from among the TRACKs (in some embodiments, a plurality of TRACKs) targeted for assignment acquired in step S506 in FIG. 5. The selected TRACK is defined as a first TRACK.

Next, in step S602, the CPU 101 selects one piece of person data from among the person data stored in the person data set 117. The selected person is defined as a first person.

In step S603, the CPU 101 determines the coexistence possibility between the first TRACK and each TRACK belonging to the first person.

A specific example of determination processing of the coexistence possibility of the TRACK of step S603 will now be described with reference to FIGS. 7A and 7B.

In the example in FIG. 7A, two TRACKs, a TRACK 701 and a TRACK 702, exist in the captured image sequence.

In this example, the TRACK 701 includes a detection box 701a to a detection box 701d for a person. Whereas, the TRACK 702 includes detection boxes 702a to 702d. The horizontal axis indicates the appearance time of the detection boxes.

A supplementary description will now be given for the TRACK 702. The detection boxes 702b and 702c in the TRACK 702 are not in a temporally adjacent frame relationship. It should be understood that the same track ID assigned to the detection boxes 702a and 702b is assigned to the detection box 702c due to the result of the tracing processing by the tracing unit 108 (details thereof will be described below). Also, the subsequent detection box 702d has the same track ID as the detection box 702c due to the tracking processing by the tracking unit 103.

As illustrated in FIG. 7A, the detection box 701b of the TRACK 701 and the detection box 702c of the TRACK 702 appear at the same time. Also, the detection box 701c of the TRACK 701 and the detection box 702d of the TRACK 702 appear at the same time. Thus, if it is assumed that the TRACK 701 and the TRACK 702 are the same person, it follows that the same person appears multiple times in one screen at the same time, resulting in an inconsistency. Accordingly, for the example in FIG. 7A, it can be determined that the same person cannot coexist in the TRACK 701 and the TRACK 702. In other words, the CPU 101 determines that the TRACKs 701 and 702 point toward there being different persons.

As in FIG. 7A, in FIG. 7B, a TRACK 703 and a TRACK 704 exist in the captured image sequence. The TRACK 703 includes detection boxes 703a to 703c, and the TRACK 704 includes detection boxes 704a and 704b. It should be understood that the detection boxes 703b and 703c of the TRACK 703 are not in an adjacent frame relationship and the detection boxes 704a and 704b of the TRACK 704 are not in an adjacent frame relationship for the same reasons as the TRACK 702 in FIG. 7A.

In the example in FIG. 7B, no detection boxes appear at the same time in the TRACK 703 and the TRACK 704. Thus, the CPU 101 determines that the same person can coexist in the TRACK 703 and the TRACK 704. In this manner, by comparing the appearance times of the detection boxes included in two TRACKs, the coexistence possibility of TRACKs can be determined.

Note that detection box simultaneity determination processing may be executed only when the TRACK appearance time is calculated on the basis of the first appearance time and the last appearance time of the TRACK and there is overlap in the appearance times. In this case, the number of times the determination processing for the appearance times of the detection boxes is executed can be decreased.

Returning to FIGS. 6A and 6B, the description of the person similarity calculation processing will now be continued.

In step S604, the CPU 101 determines whether or not there is a TRACK (second TRACK) that has been determined to have no coexistence possibility in step S603. When the CPU 101 determines that a TRACK that has been determined to have no coexistence possibility exists, the CPU 101 advances the processing to step S606, and when the CPU 101 determines that such a TRACK does not exist, the CPU 101 advances the processing to step S605.

In step S605, the CPU 101 calculates the similarity between the first TRACK and the TRACK (not limited to one TRACK) belonging to the first person ID and advances the processing to step S611.

For example, the first TRACK which is a target for person ID assignment corresponds to the TRACK with 7 for the track ID in FIG. 3D. Also, the first person corresponds to the person with 1 for the person ID in FIG. 3B. The TRACKs belonging to the person ID 1 have the track ID of {1, 3, 4 . . . }. In this example, it is assumed that the TRACK with a track ID of 7 has coexistence possibility with all of the track IDs {1, 3, 4 . . . }. In this case, the CPU 101 determines that a second TRACK does not exist for the TRACK belonging to the first person and advances the processing to step S605. Also, in step S605, the CPU 101 calculates the similarity between the feature amount (feature8) of the track ID 7 and the feature amount of each TRACK indicated by the Track IDs {1, 3, 4 . . . }.

When the group of IDs of the two TRACKs for which similarity is acquired are represented by {#1:#2}, the CPU 101 calculates the similarity of the following groups. {7:1}, {7:3}, {7:4}, . . . .

The processing proceeds to step S606 when a TRACK with no coexistence possibility with the first TRACK exists among the TRACKs belonging to the first person. Next, the processing of steps S606 to S610 will be described with reference to FIGS. 8A and 8B.

In FIG. 8A, the first TRACK is represented by a TRACK 801, and the TRACKs belonging to the first person are represented by TRACKs 802 to 804. Of these, the TRACK 804 is the second TRACK with no coexistence possibility with the TRACK 801.

In step S606, as illustrated in FIG. 8A, the CPU 101 calculates the similarity between the first TRACK 801 and each TRACK (the TRACKs 802 and 803) of the TRACKs belonging to the first person excluding the second TRACK. The present processing is defined as a first similarity calculation processing, and the average value of the obtained similarities is defined as a first similarity. When the targets of the similarity calculations described above are written in groups, the CPU 101 calculates the similarities {801:802} and {801:803} and takes the average value as the first similarity.

In step S607, as illustrated in FIG. 8B, the CPU 101 calculates the similarity between the first TRACK 804 and each TRACK (the TRACKs 802 and 803) of the TRACKs in the first person excluding the second TRACK. The present processing is defined as a second similarity calculation processing, and the average value of the obtained similarities is defined as a second similarity. When the targets of the similarity calculations described above are written in groups, the CPU 101 calculates the similarities {804:802} and {804:803} and takes the average value as the second similarity.

Note that in the present embodiment, the average of a plurality of similarities is used as the first similarity and the second similarity. However, a maximum value, a minimum value, a median value, or the like may be used instead.

In step S608, the CPU 101 compares the values of the first similarity and the second similarity. Then, when the second similarity is greater than the first similarity, the CPU 101 branches the processing to step S609, and when the second similarity is equal to or less than the first similarity, the CPU 101 branches the processing to step S610.

The processing proceeds to step S609 when the appropriate TRACK for assigning to the first person is the second TRACK rather than the first TRACK. Thus, the CPU 101 sets the value of the similarity between the first TRACK and the first person to 0 so that the first TRACK is not assigned to the first person. Note that instead of using 0, a value indicating an invalid number may be used for the similarity in this case.

The processing proceeds to step S610 when the second similarity is equal to or less than the first similarity. This means that the appropriate TRACK for assigning to the first person is the first TRACK rather than the second TRACK. Accordingly, the CPU 101 determines the similarity between the first TRACK and the first person to be the first similarity and enables assignment processing according to the value indicated by the first similarity. When the first TRACK is assigned to the first person, the assignment processing result corresponds to the first TRACK and the second TRACK with no coexistence possibility existing in the same person. The inconsistency resolving processing in this case will be described below using FIG. 9.

As described above, when the calculation of the similarity between the first TRACK and the first person is complete, the CPU 101 advances the processing to step S611.

In step S611, the CPU 101 determines whether the calculations of the similarity between the first TRACK and the all of the persons in the person data set 117 are complete. When it is determined that a person for which similarity calculation has not been completed exists, the processing proceeds to step S602. For example, when the person with the person ID 1 had been set as the first person in the processing described above using FIG. 3B, the CPU 101 sets the person with the person ID 2 as the new first person and executes the processing from step S602 onward.

In step S611, when the CPU 101 determines that the processing for all of the persons is complete, the CPU 101 advances the processing to step S612.

In step S612, it is determined whether the similarity calculations for all of the TRACKs targeted for person ID assignment are complete. When the processing for all of the TRACKs targeted for assignment is not complete, the processing returns to step S601, and processing is executed for the next TRACK targeted for assignment. When the processing for all of the TRACKs targeted for assignment is complete, the flow in FIGS. 6A and 6B ends.

Next, the person data update processing of step S509 in FIG. 5 will be described in detail with reference to the flowchart in FIG. 9. It should be noted that step S509 is executed after the person ID assignment processing in step S508. To simplify the following description, it is assumed that, in step S508, the TRACK targeted for person assignment has been assigned a person ID including the TRACK with the highest similarity obtained in step S507, irrespective of the coexistence possibility.

In step S901, the CPU 101 selects one of the TRACK targeted for person ID assignment (the first TRACK). In this example, each TRACK targeted for assignment has been assigned one person ID.

In step S902, the CPU 101 determines whether there is a coexistence possibility between the first TRACK and each TRACK belonging to the person (a second person) corresponding to the person ID assigned to the first TRACK. The coexistence possibility determination method is similar to that in step S603 in FIG. 6A.

In step S903, the CPU 101 branches the processing at step S902 according to whether or not there is a TRACK (a third TRACK) with no coexistence possibility among the TRACKs belonging to the second person. When there is no third TRACK, the CPU 101 advances the processing to step S905 and registers the first TRACK and the second person associated together.

On the other hand, in step S903, when the CPU 101 determines that a third TRACK exists, the CPU 101 advances the processing to step S904.

Figure 6A:
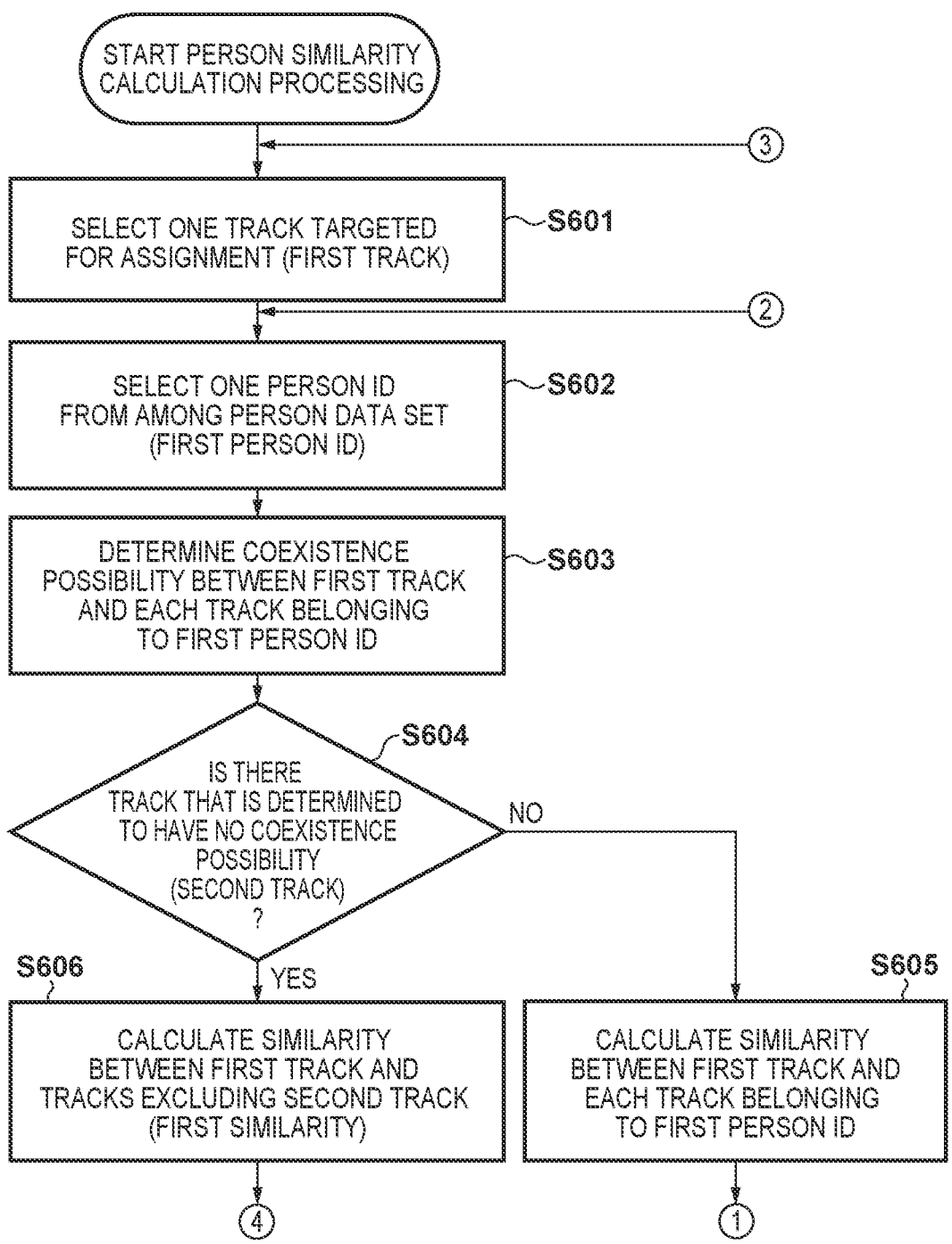
FIGS. 6A and 6B are flowcharts illustrating a person similarity calculation method according to the first embodiment.
Figure 6B:
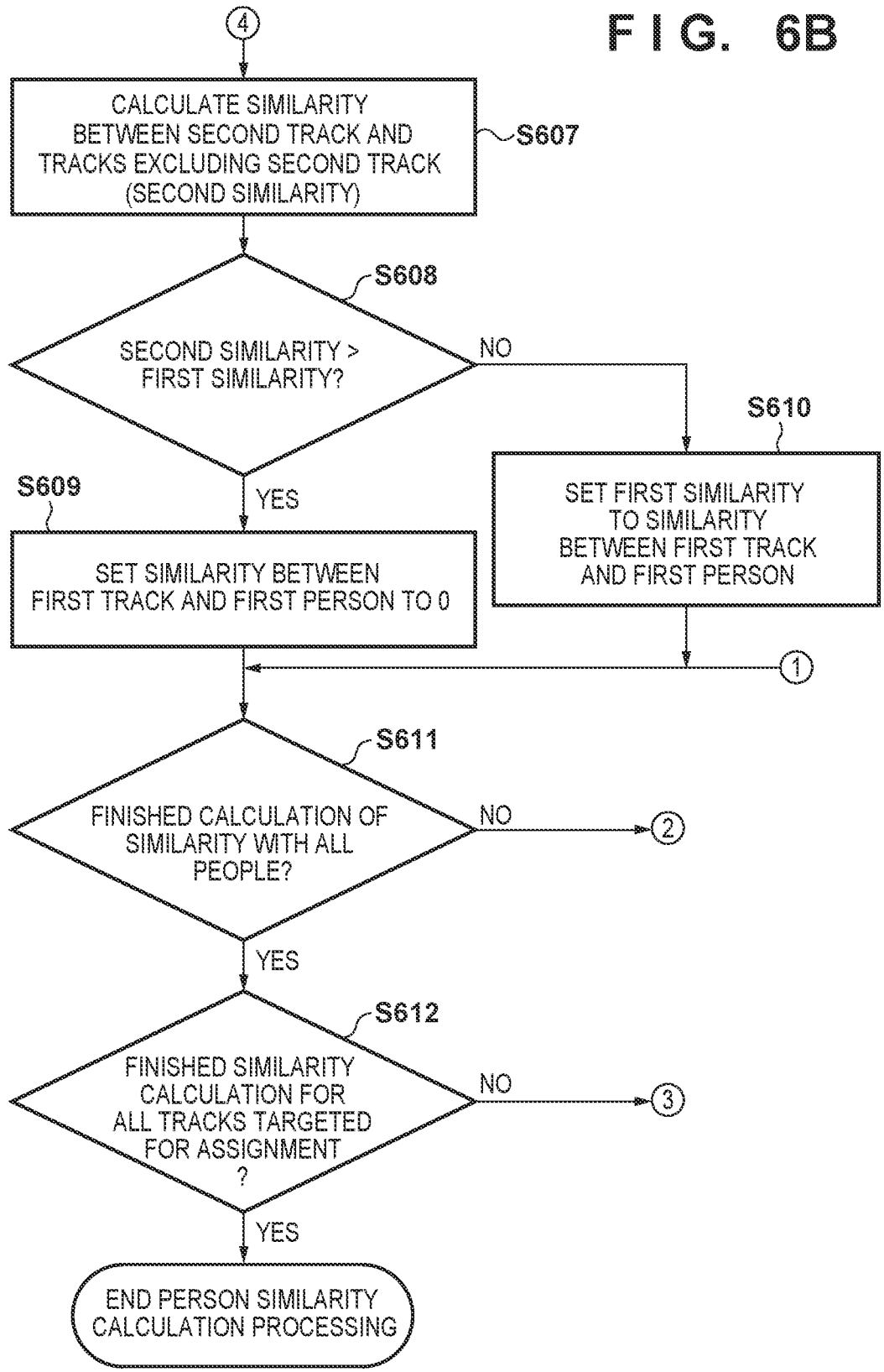

As described in the person similarity calculation processing in FIGS. 6A and 6B, when the similarity between the third TRACK and the second person is higher than the similarity between the first TRACK and the second person, the first TRACK is not assigned to the second person. The first TRACK being assigned to the second person means that the appropriate TRACK for assigning to the second person is the first TRACK rather than the third TRACK. Accordingly, in step S904, the CPU 101 deletes the information associating the second person and the third TRACK and sets the third TRACK to a person ID non-assigned state. Then, in step S905, the CPU 101 registers the first TRACK and the second person associated together. For the third TRACK, person ID assignment processing may be executed again in the tracing processing of the next frame or it may be left unchanged in a person ID non-assigned state.

Next, in step S906, the CPU 101 determines whether the processing for all of the TRACKs targeted for assignment is complete. When the CPU 101 determines that the processing for all of the TRACKs targeted for assignment is not complete, the CPU 101 returns the processing to step S901 and repeats the processing for an unprocessed TRACK targeted for assignment. When the CPU 101 determines that the processing for all of the TRACKs targeted for assignment is complete, the CPU 101 advances the processing to step S907. In step S907, the CPU 101 outputs the tracking and tracing result 120. As the tracking and tracing result 120, in addition to the detection box, that is the tracking output, and the track ID and person ID association information, the person ID correction information 311 is also output. When the third TRACK is returned to a person ID non-assigned state in step S904, the person ID correction information 311 indicates that the person ID of the third TRACK has been corrected. For example, 1 is output when there has been a correction, and 0 is output when has been no correction. In this manner, whether or not the person ID has been corrected can be indicated.

Figure 9:
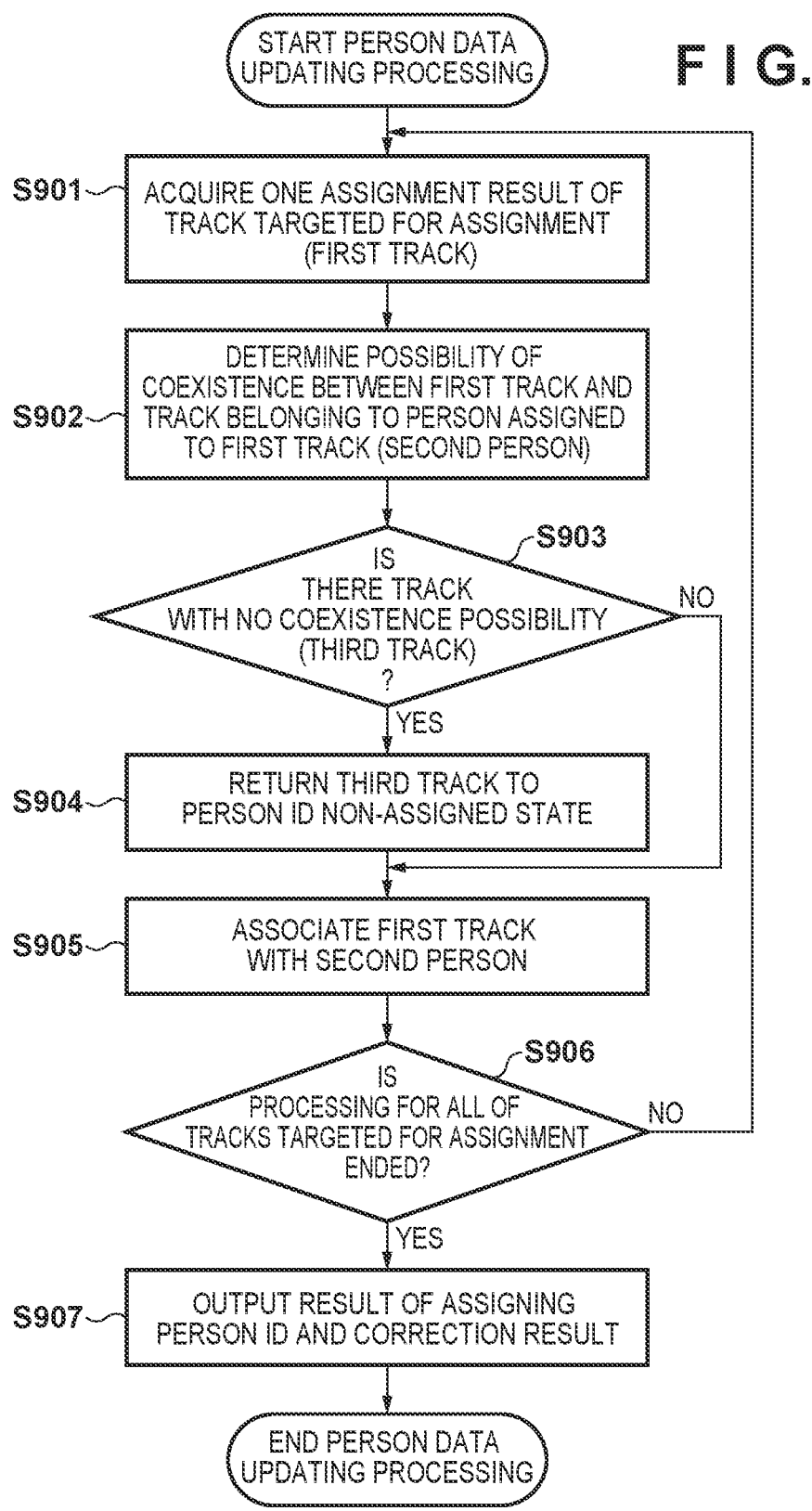
FIG. 9 is a flowchart of person data update processing according to the first embodiment.

Note that though not listed in FIG. 9, for a person with no TRACK appearances for a certain period of time, the data of the corresponding person and the data of the TRACK associated with the person may be deleted from the person data set 117.

According to the present embodiment, person IDs can be assigned to TRACKs so that a plurality of TRACKs with no coexistence possibility do not exist in a person. When a TRACK with no coexistence possibility with the TRACK targeted for assignment exists for the person, whether the TRACK targeted for assignment should be assigned to a person can be determined on the basis of the similarity to TRACKs in the person excluding TRACKs with no coexistence possibility. Typically, with a method for merging movement trajectories using feature amounts based on the appearance of a person, when a movement trajectory is assigned to a person, the movement trajectory is simply assigned to the person with the highest similarity. This may result in an inconsistency, with the same person existing multiple times on the same screen at the same time. However, with the present method, of two TRACKs with no coexistence possibility, which is more suitable for the person overall can be efficiently determined.

Second Embodiment

The second embodiment will be described below. In the second embodiment, processing executed when two TRACKs with no coexistence possibility in a TRACK belonging to a person ID exist will be described. The apparatus configuration according to the present embodiment is similar to that of the first embodiment except for the similarity calculation method, and such a description thereof is omitted.

Figure 10A:
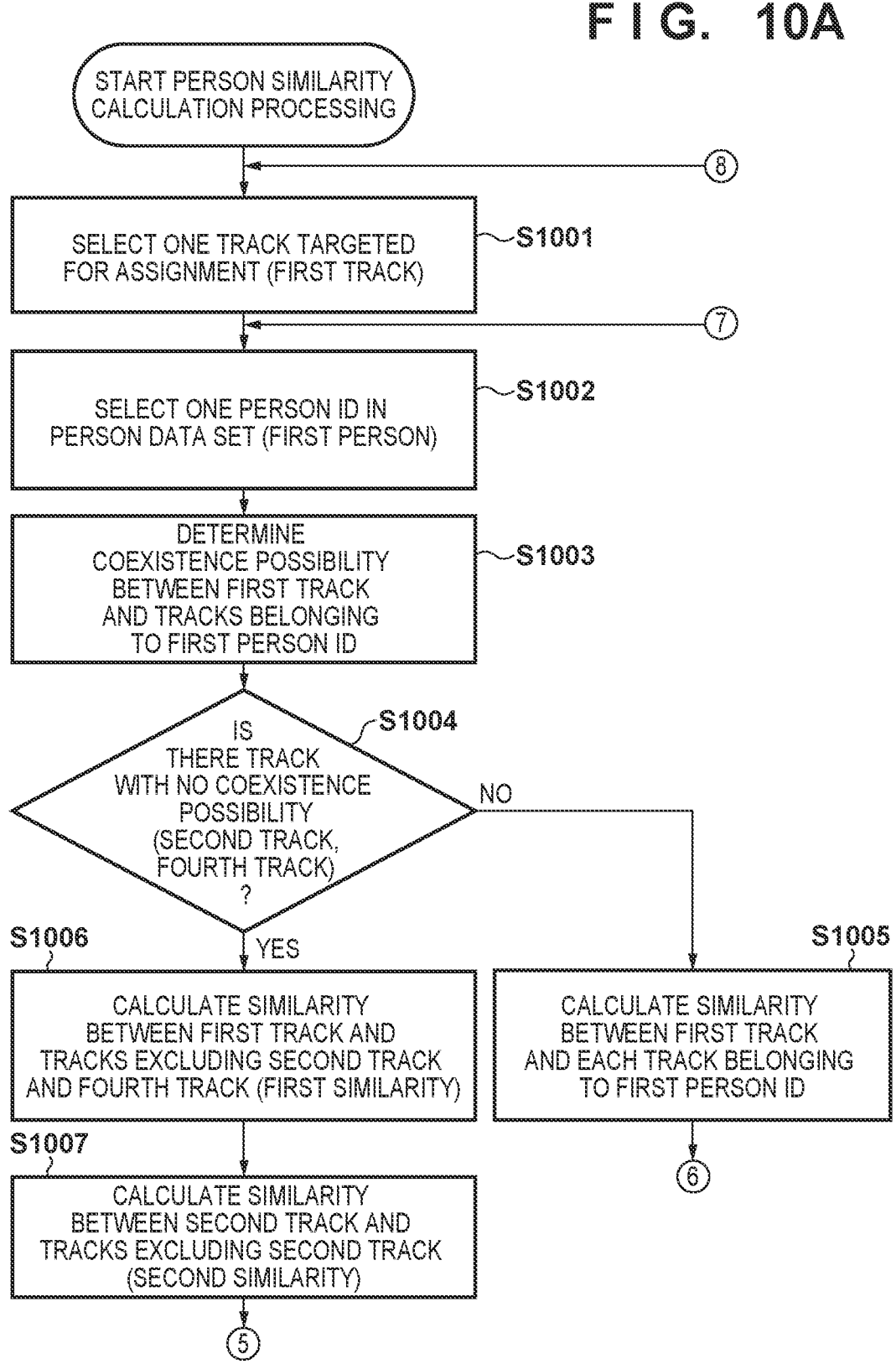
FIGS. 10A and 10B are flowcharts of a person similarity calculation method according to a second embodiment.
Figure 10B:
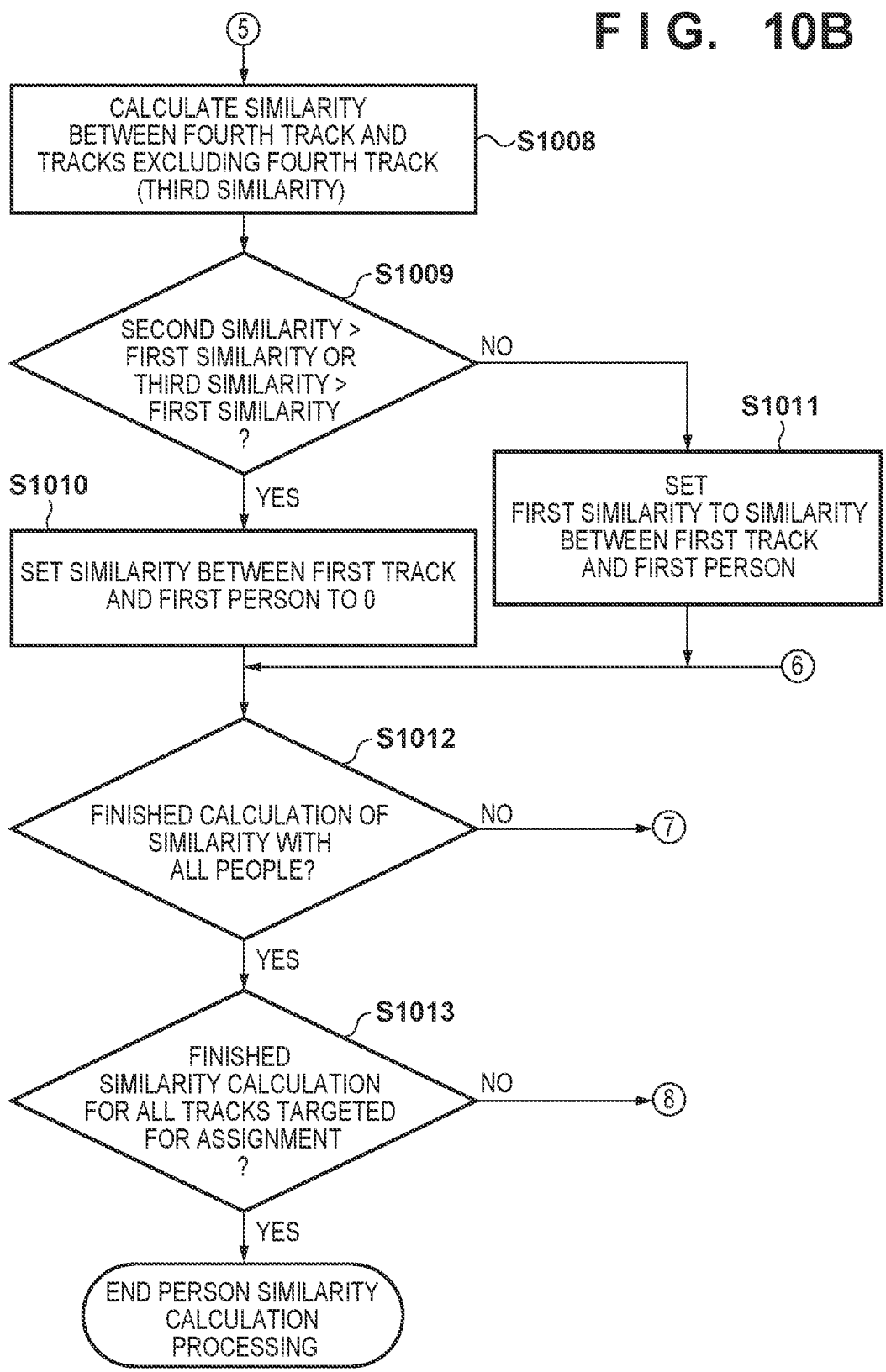

The similarity calculation processing according to the second embodiment will be described in detail with reference to the flowcharts in FIGS. 10A and 10B.

In step S1001, the CPU 101 selects one TRACK from among the TRACKs targeted for assignment acquired in step S506. The selected TRACK is defined as the first TRACK.

Next, in step S1002, the CPU 101 selects one piece of person data stored in the person data set 117. The selected person is defined as the first person.

In step S1003, the CPU 101 determines the coexistence possibility between the first TRACK and each TRACK belonging to the first person.

In step S1004, the CPU 101 determines whether or not a TRACK (the second TRACK and a fourth TRACK) with no coexistence possibility with the first TRACK exists in the TRACK belonging to the first person. When the CPU 101 determines that the second TRACK and the fourth TRACK do not exist, the CPU 101 advances the processing to step S1005 and calculates the similarity between the first TRACK and each TRACK in the first person.

On the other hand, in step S1004, when the CPU 101 determines that the second TRACK (and also the fourth TRACK) does exist, the CPU 101 advances the processing to step S1006.

Now the processing of steps S1006 to S1011 will be described with reference to FIGS. 11A to 11C.

Figure 11A:
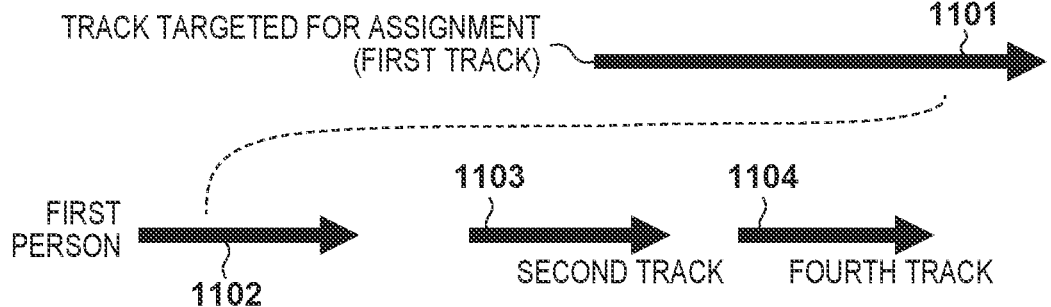
FIGS. 11A to 11C are diagrams illustrating a similarity calculation method according to the second embodiment.

In FIG. 11A, the first TRACK is represented by a TRACK 1101, and the TRACKs belonging to the first person are represented by TRACKs 1102 to 1104. Of these, the TRACKs 1103 and 1104 are the TRACKs with no coexistence possibility with the TRACK 1101 and correspond to the second TRACK and the fourth TRACK.

In step S1006, as illustrated in FIG. 11A, the CPU 101 calculates the similarity between the first TRACK 1101 and the TRACK (the TRACK 1102) of the TRACKs in the first person excluding the second TRACK 1103 and the fourth TRACK 1104. This processing is defined as the first similarity calculation processing, and the average value of the obtained similarities is defined as the first similarity. In the example in FIG. 11A, when the second and fourth TRACKs are excluded from the TRACKs belonging to the first person, only one TRACK, the TRACK 1102, remains. Thus, the similarity between the first TRACK 1101 and the second TRACK 1102 equals the first similarity.

Figure 11B:
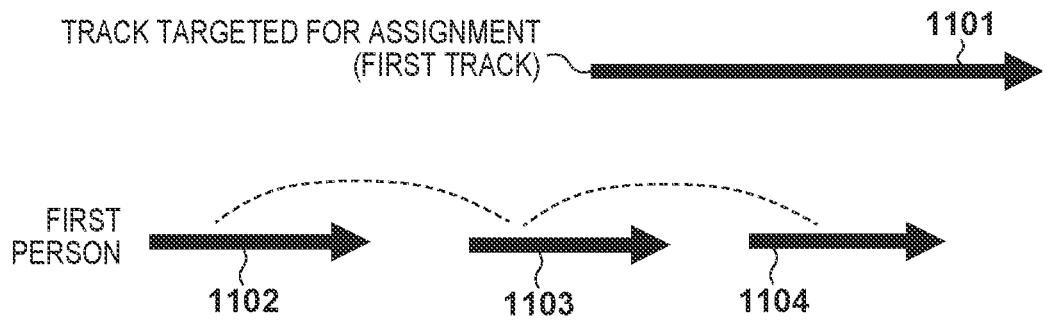

In step S1007, as illustrated in FIG. 11B, the CPU 101 calculates the similarity between the second TRACK 1103 and the TRACKs (the TRACKs 1102 and 1104) of the TRACKs belonging to the first person excluding the second TRACK. The present processing is defined as the second similarity calculation processing, and the average value of the obtained similarities is defined as the second similarity. When written as used above, the CPU 101 calculates the similarities {1103:1102} and {1103:1104} and takes the average value as the second similarity.

Figure 11C:
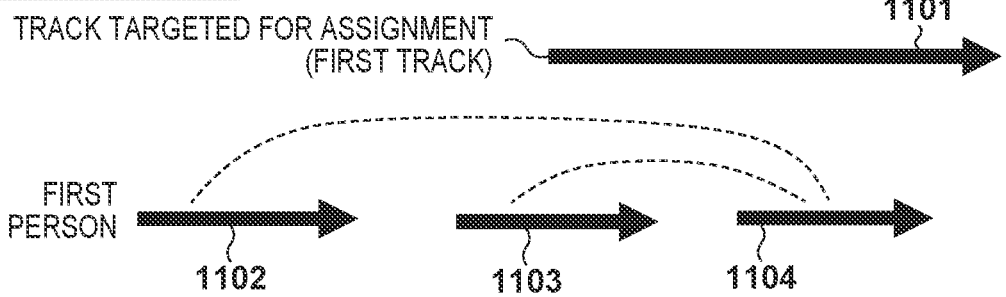

In step S1008, as illustrated in FIG. 11C, the CPU 101 calculates the similarity between the fourth TRACK 1104 and the TRACKs (the TRACKs 1102 and 1103) of the TRACKs belonging to the first person excluding the fourth TRACK. The present processing is defined as a third similarity calculation processing, and the average value of the obtained similarities is defined as a third similarity. When written as used above, the CPU 101 calculates the similarities {1104:1102} and {1104:1103} and takes the average value as the third similarity.

Note that when the fourth TRACK does not exist, the processing of step S1008 is not executed, and the third similarity is not calculated.

In step S1009, the CPU 101 compares the values of first similarity and the second similarity and the first similarity and the third similarity and branches the processing.

When the CPU 101 determines that the first similarity is less than either the second similarity or the third similarity (if it exists), the CPU 101 advances the processing to step S1010. In this case, it means that the appropriate TRACK for assigning to the first person is the second TRACK or the fourth TRACK rather than the first TRACK. Thus, the CPU 101 sets the value of the similarity between the first TRACK and the first person to 0 so that the first TRACK is not assigned to the first person.

On the other hand, in step S1009, when the CPU 101 determines that the first similarity is equal to or greater than the second similarity and the third similarity (if it exists), the CPU 101 advances the processing to step S1011. In this case, it means that the appropriate TRACK for assigning to the first person is the first TRACK rather than the second TRACK and the fourth TRACK. Accordingly, the CPU 101 can execute assignment processing according to the value indicated by the similarity using the similarity between the first TRACK and the first person as the first similarity.

In step S1012, the CPU 101 determines whether the calculations of the similarity between the first TRACK and the all of the persons in the person data set 117 are complete. When the CPU 101 determines that the similarity calculations for all of the persons is not complete, the CPU 101 returns the processing to step S1012-S1002 and repeats the processing for the next person. Also, when the CPU 101 determines that the processing for all of the persons is complete, the CPU 101 advances the processing to step S1013.

In step S1013, the CPU 101 determines whether the similarity calculations for all of the TRACKs targeted for person ID assignment are complete. When the CPU 101 determines that a TRACK targeted for person ID assignment exists, the CPU 101 returns the processing to step S1001 and repeats the processing on the next TRACK targeted for assignment. When the processing for all of the TRACKs targeted for assignment is complete, the present flow ends.

According to the present embodiment, when two TRACKs with no coexistence possibility with the TRACK targeted for person ID assignment exist among the TRACKs belonging to one person, which TRACK is more suitable to be assigned to the person can be efficiently determined.

Third Embodiment

The embodiment described above is an example in which two TRACKs with no coexistence possibility with the TRACK targeted for person ID assignment exist among the TRACKs belonging to one person. In the third embodiment, a generalized similarity calculation processing executed when N number of TRACKs with no coexistence possibility exist will be described. The apparatus configurations and meaning of terms as the same as in the first and second embodiment described above. Also, in the third embodiment, the target of tracking and tracing is not limited to being a person and may be a moving body such as a vehicle. Thus, the tracking and tracing target will be simply referred to as a target object.

In the first similarity calculation processing according to the third embodiment, the similarity between the first TRACK and the TRACKs of the TRACKs belonging to a first target object (the person in the first and second embodiment) excluding the N number of TRACKs with no coexistence possibility is calculated, and the average value of these similarities is set as the first similarity.

In the second similarity calculation processing, the CPU 101 calculates the similarity between the k-th TRACK of the N number of TRACKs with no coexistence possibility belonging to the first target object and the TRACKs of the TRACKs belonging to the first target object excluding the k-th TRACK. Then, the average value of the similarities calculated for the k-th TRACK is set as a k-th similarity. The similarity with k is calculated in a similar manner for all of the N number of TRACKs with no coexistence possibility.

Then, the first similarity and the k-th similarity are sequentially compared, and, when the first similarity is less than any of the k-th similarities, the value of the similarity between the first TRACK and the first target object is set to 0. On the other hand, when the first similarity is equal to or greater than the k-th similarities, using the similarity between the first TRACK and the first target object, assignment processing according to the value of the similarity can be executed.

According to the third embodiment, when a plurality of TRACKs with no coexistence possibility with the TRACK targeted for assignment exist in the person, which TRACK is more suitable to be assigned to the person can be efficiently determined.

Fourth Embodiment

The fourth embodiment of the present invention will be described below. In the first to third embodiments described above, the TRACKs from the video of one camera are joined together in the tracing processing. However, in the fourth embodiment, TRACKs from the video of a plurality of cameras are joined together. In the present embodiment, other than the coexistence possibility determination method for TRACKs, the apparatus configurations and terms are the same as in the first embodiment, and thus description thereof is omitted.

Figure 12:
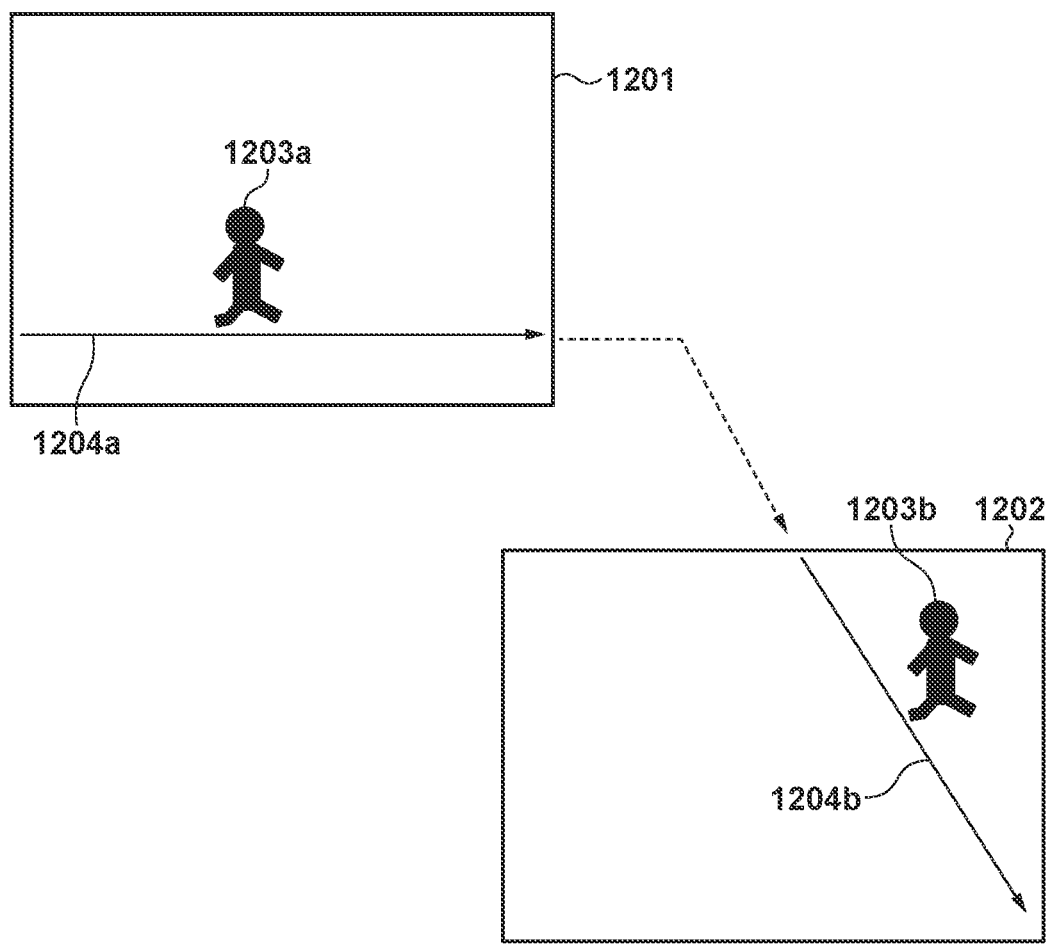
FIG. 12 is a diagram outlining a tracing processing between a plurality of cameras according to a fourth embodiment.

FIG. 12 is a diagram illustrating an example of the tracking and tracing of one person in a video from two cameras. The storage unit 113 stores information relating to the placement position of the two cameras, the image capture optical axis direction, the field angle, and the like.

In the present example, an image 1201 and an image 1202 correspond to videos from different cameras. A person 1203 is moving between the field of view areas of the first and second camera, with persons 1203a and 1203b representing the appearance positions of the person 1203 at different times.

First, tracking processing is executed on the person 1203a that has moved in from the left edge of the screen of the image 1201 captured by the first camera, and a corresponding TRACK 1204*a* is acquired. Thereafter, the person 1203 moves outside of the imaging area of the first camera and enters a state of not being shown in the video. Thus, the TRACK is considered to be in an interrupted state, and even if the same person appears again, tracking is executed as a different TRACK.

Thereafter, the person 1203 enters the imaging area of the second camera, appearing as the person 1203*b* in the image 1202. The corresponding TRACK is acquired as a TRACK 1204*b*. In the tracing processing, the TRACKs 1204*a* and 1204*b* are merged, and information in which a person ID indicating the same person is assigned to the merged TRACKs 1204*a* and 1204*b* is output.

Note that in the present diagram, the image 1201 and the image 1202 correspond to the video of cameras showing different locations. However, the cameras may be used with overlapping fields of view to capture images of the same location from different angles.

Figure 13:
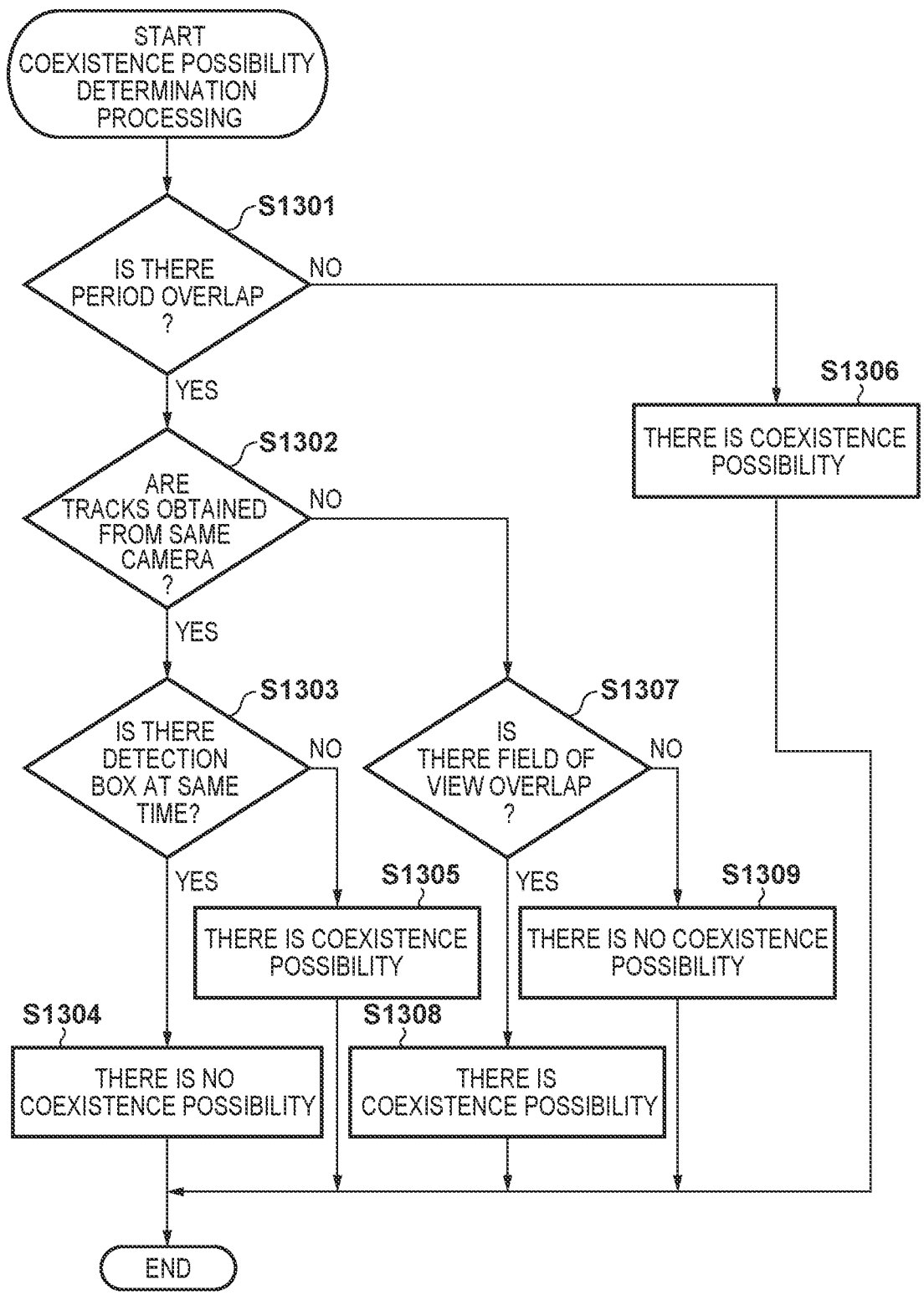
FIG. 13 is a flowchart of a coexistence possibility determination method for TRACKs according to the fourth embodiment.

The coexistence possibility determination processing according to the fourth embodiment will now be described using FIG. 13. In step S1301, the CPU 101 determines whether two TRACKs, determination targets, overlap in terms of appearance period. Here, for each TRACK, the period from the appearance time of the first detection box and the appearance time of the last detection box is defined as the appearance period of the TRACK. When the CPU 101 determines that there is no appearance period overlap, the CPU 101 advances the processing to step S1306 and determines that there is coexistence possibility.

In step S1301, when the CPU 101 determines that there is appearance period overlap, the CPU 101 advances the processing to step S1302. In step S1302, the CPU 101 determines whether or not the two determination target TRACKs are obtained from the same camera. When the CPU 101 determines that the two TRACKs are TRACKs obtained from the same camera, the CPU 101 advances the processing to step S1303 and determines whether or not each TRACK includes a detection box appearing at the same time. When the CPU 101 determines that there is a detection box appearing at the same time in the two TRACKs, the CPU 101 advances the processing to step S1304 and determines that there is no coexistence possibility. On the other hand, when the CPU 101 determines that there are no detection boxes appearing at the same time in the two TRACKs, the CPU 101 advances the processing to step S1305 and determines that there is coexistence possibility. The processing of steps S1303 to S1305 is the same as the coexistence possibility determination method according to the first embodiment.

In step S1302, when the CPU 101 determines that the two TRACKs are TRACKs obtained from the image capture of different cameras, the CPU 101 advances the processing to step S1307. In step S1307, the CPU 101 determines whether or not there is field of view overlap between the two cameras which acquired the two TRACKs. As described above, the field of view overlap between the cameras is determined on the basis of information relating to the placement position of the cameras, the optical axis direction, the field angle, and the like input in advance by the user to the storage unit 113. When there is field of view overlap, it can be thought that the same person is shown in different cameras in the same period. Thus, in step S1308, the CPU 101 determines that there is coexistence possibility. On the other hand, when there is no field of view overlap between the two cameras, it means that the same person does not appear in the same period in cameras showing different locations. Thus, in step S1309, the CPU 101 determines that there is no coexistence possibility.

Figure 14A:
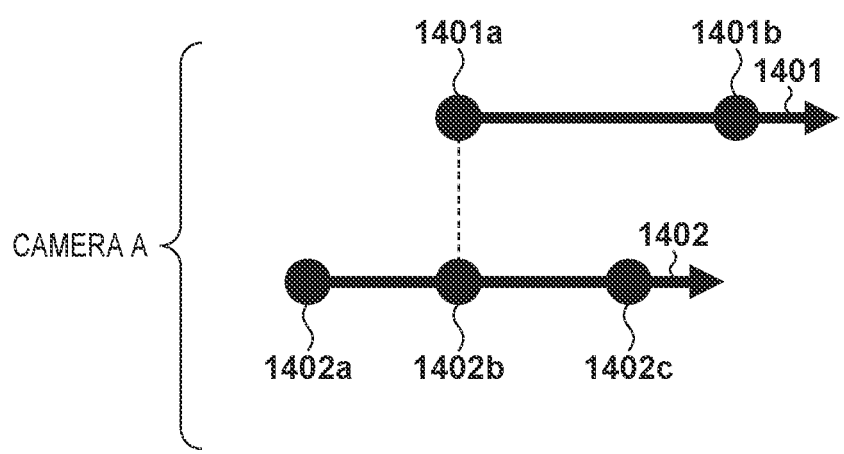
FIGS. 14A and 14B are explanatory diagrams of a coexistence possibility determination method for TRACKs according to the fourth embodiment.

A specific example of the coexistence possibility determination processing will now be described with reference to FIGS. 14A and 14B. FIG. 14A is an example in which whether a TRACK 1401 and a TRACK 1402 acquired from the same camera A can coexist as the same person is determined. The TRACK 1401 includes detection boxes 1401*a* to 1401*b*, and the TRACK 1402 includes detection boxes 1402*a* to 1402*c*. In this case, in the same camera, the detection box 1401*a* and the detection box 1402*b* appear at the same time, and thus no coexistence possibility is determined.

Figure 14B:
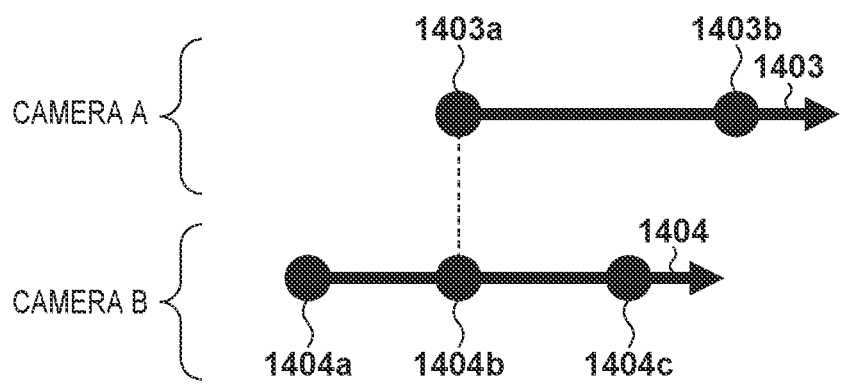

FIG. 14B is an example in which whether a TRACK 1403 acquired from camera A and a TRACK 1404 acquired from the camera B can coexist as the same person is determined. The TRACK 1403 includes detection boxes 1403*a* to 1403*b*, and the TRACK 1404 includes detection boxes 1404*a* to 1404*c*. In this example, the TRACK 1403 and the TRACK 1404 overlap in the appearance period. Thus, if there is field of view overlap between the camera A and the camera B, it can be determined that there is coexistence possibility. On the other hand, if there is no field of view overlap between the camera A and the camera B, no coexistence possibility is determined.

In the example described above, two cameras are used. However, even if there are three or more cameras, coexistence possibility can be determined and control can be performed so that TRACKs with no coexistence possibility are not assigned to the same person.

In the example illustrated in FIG. 7B, a more advanced coexistence possibility determination method may be used. In the first embodiment, there no detection boxes that appear at the same time in the TRACK 703 and the TRACK 704. Thus, it is determined that there is coexistence possibility in the same person. However, when the appearance periods of the TRACK 703 and the TRACK 704 overlap and the TRACK 703 and the TRACK 704 are the same person, for example, this means that one person has been tracked on two separate TRACKs by the same camera at times very close to one another. Since the track ID is assigned on the basis of the closeness in appearance position during tracking, similarity in image features, and the like, when the feature amount similarity is reduced due to a localized cover or the like, the same person may be tracked as a different TRACK. However, when the position, size, and the feature amount similarity of the detection boxes of the TRACK 703 and the TRACK 704 differ greatly, the TRACKs being the same person is implausible. Thus, when the appearance periods of the TRACKs overlap but there are not detection boxes appearing at the same time, the position, size, and the feature amount similarity of the detection boxes of the TRACKs are calculated. When the similarity is equal to or less than a predetermined value, it may be determined that there is no coexistence possibility.

Note that in the present embodiment, the tracking and tracing target is a person. However, the present embodiment may be applied to a different moving body, such as a vehicle, animal, or the like, and the movement trajectories of the same object can be acquired. In this case, by substituting the person similarity calculation unit with an object similarity calculation unit, the person ID assignment unit with an object ID assignment unit, the person data updating unit with an object data updating unit, and the person data set with an object data set, typical object tracing can be performed instead of person tracing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-064647, filed Apr. 8, 2022 which is hereby incorporated by reference herein in its entirety.

What is claimed is:

1. An object tracing apparatus that traces an object in a video obtained by an image capturing apparatus, comprising:
   a processor; and
   a memory storing instructions which, when read and executed by the processor, causes the object tracing apparatus function as:
   a tracking unit that tracks the object in a frame in the video and obtains track data indicating consecutive appearances of the object,
      wherein, the tracking unit
      detects a region of the object in a target frame in the video and assigns a new track ID to the region detected from the target frame when the region is not a region subsequent to a region detected in a previous frame to the target frame, and
      when the region detected from the target frame is a region subsequent to the region detected in the previous frame, a track ID identical to that of the region corresponding to the previous frame is assigned to the region detected from the target frame to obtain track data indicating a consecutive appearance of an identical object; and
   a tracing unit that generates trace information indicating which object ID each track ID belongs to, by associating a track ID obtained via tracking by the tracking unit with an object ID for uniquely identifying an object,
      wherein the tracing unit
      on a basis of a coexistence possibility relating to imaging time between a track ID associated with one or more existing object IDs and target track data without an associated object ID, determines which object ID the target track data belongs to,
   wherein
   the tracking unit includes an extraction unit that extracts a feature amount of the region of the object, and
   the tracking unit
   on a basis of the feature amount of the region of the object in the target frame, a position and size of the region, a feature amount of the region of the object in the previous frame, and a position and size of the region, determines whether or not the region in the target frame is a region subsequent to the region detected in the previous frame, and
   associates region information including the position and size of the region of the object in the target frame, the feature amount, and the imaging time with a track ID, wherein
      when one existing object ID is defined as a first object ID,
      from among track IDs associated with the first object ID, a track ID with coexistence possibility with a target TRACK without an associated object ID is defined as a first track ID and a track ID without coexistence possibility is defined as a second track ID, and
      for the first track ID, a similarity based on feature amount between a target TRACK without an associated object ID and each track belonging to the first track ID is defined as a similarity between the target TRACK and the first object ID,
   the tracing unit
   for the second track ID
      obtains a first similarity between the target track data and track data excluding track data with no coexistence possibility in the second track ID,
      obtains a second similarity between track data with no coexistence possibility belonging to the second track ID and track data excluding the TRACK,
      sets a similarity between the target track data and the first object ID to 0 when the first similarity is greater than the second similarity,
      sets a similarity between the target track data and track data with coexistence possibility in the second track ID as a similarity between the target track data and the first object ID when the first similarity is equal to or less than the second similarity, and
      determines which object ID the target track data without an associated object ID belongs to from similarities for existing object IDs.

2. The apparatus according to claim 1, wherein the tracing unit determines that the target track data without an associated object ID belongs to an object ID with, from among similarities between the target track data without an associated object ID and each object ID of the existing object IDs, a similarity equal to or greater than a threshold and a largest similarity corresponding to an object with a largest similarity.

3. The apparatus according to claim 2, wherein when no similarity equal to or greater than the threshold exists among similarities between the target track data without an associated object ID and each object ID of the existing object IDs, the tracing unit generates a new object ID for the target track data without an associated object ID.

4. The apparatus according to claim 1, wherein the object is a person.

5. An object tracing apparatus that traces an object in a video obtained by an image capturing apparatus, comprising:
a processor; and
a memory storing instructions which, when read and executed by the processor, causes the object tracing apparatus function as:
a tracking unit that tracks the object in a frame in the video and obtains track data indicating consecutive appearances of the object,
wherein, the tracking unit
detects a region of the object in a target frame in the video and assigns a new track ID to the region detected from the target frame when the region is not a region subsequent to a region detected in a previous frame to the target frame, and
when the region detected from the target frame is a region subsequent to the region detected in the previous frame, a track ID identical to that of the region corresponding to the previous frame is assigned to the region detected from the target frame to obtain track data indicating a consecutive appearance of an identical object;
a tracing unit that generates trace information indicating which object ID each track ID belongs to, by associating a track ID obtained via tracking by the tracking unit with an object ID for uniquely identifying an object,
wherein the tracing unit on a basis of a coexistence possibility relating to imaging time between a track ID associated with one or more existing object IDs and target track data without an associated object ID, determines which object ID the target track data belongs to; and
a storing unit that stores information relating to a placement position, optical axis direction, and a field angle of a plurality of image capturing apparatuses,
wherein the tracking unit tracks in a video from each one of the plurality of image capturing apparatuses, and
the tracing unit
when the information stored in the storing unit indicates that the plurality of image capturing apparatuses have no overlapping fields of view, determines that there is coexistence possibility for track data including identical imaging times in video obtained from each one of the plurality of image capturing apparatuses, and
when the information stored in the storing unit indicates that the plurality of image capturing apparatuses have overlapping fields of view, determines that there is no coexistence possibility for track data including identical imaging times in video obtained from each one of the plurality of image capturing apparatuses.

6. A method of controlling an object tracing apparatus that traces an object in a video obtained by an image capturing apparatus, comprising:
(a) tracking the object in a frame in the video and obtains track data indicating consecutive appearances of the object,
wherein, the tracking (a) includes
(a-1) detecting a region of the object in a target frame in the video and assigning a new track ID to the region detected from the target frame when the region is not a region subsequent to a region detected in a previous frame to the target frame, and
(a-2) when the region detected from the target frame is a region subsequent to the region detected in the previous frame, assigning a track ID identical to that of the region corresponding to the previous frame to the region detected from the target frame to obtain track data indicating a consecutive appearance of an identical object; and
(b) generating trace information indicating which object ID each track ID belongs to, by associating a track ID obtained in the tracking with an object ID for uniquely identifying an object,
wherein the generating (b)
on a basis of a coexistence possibility relating to imaging time between a track ID associated with one or more existing object IDs and target track data without an associated object ID, determines which object ID the target track data belongs to,
wherein
the tracking includes extracting a feature amount of the region of the object, and
on a basis of the feature amount of the region of the object in the target frame, a positioning and size of the region, a feature amount of the region of the object in the previous frame, and a position and size of the region, determines whether or not the region in the target frame is a region subsequent to the region detected in the previous frame, and
associating region information including the position and size of the region of the object in the target frame, the feature amount, and the imaging time with a track ID, wherein
when one existing object ID is defined as a first object ID,
from among track IDs associated with the first object ID, a track ID with coexistence possibility with a target TRACK without an associated object ID is defined as a first track ID and a track ID without coexistence possibility is defined as a second track ID, and
for the first track ID, a similarity based on feature amount between a target TRACK without an associated object ID and each track belonging to the first track ID is defined as a similarity between the target TRACK and the first object ID,
for the second track ID
obtaining a first similarity between the target track data and track data excluding track data with no coexistence possibility in the second track ID,
obtaining a second similarity between track data with no coexistence possibility belonging to the second track ID and track data excluding the TRACK,
setting a similarity between the target track data and the first object ID to 0 when the first similarity is greater than the second similarity,
setting a similarity between the target track data and track data with coexistence possibility in the second track ID as a similarity between the target track data and the first object ID when the first similarity is equal to or less than the second similarity, and
determining which object ID the target track data without an associated object ID belongs to from similarities for existing object IDs.

7. A non-transitory computer readable storage medium storing a program which, when read and executed by a computer, caused the computer to perform the steps of a method of controlling an object tracing apparatus that traces an object in a video obtained by an image capturing apparatus, the method comprising:
  (a) tracking the object in a frame in the video and obtains track data indicating consecutive appearances of the object,
    wherein, the tracking (a) includes
    (a-1) detecting a region of the object in a target frame in the video and assigning a new track ID to the region detected from the target frame when the region is not a region subsequent to a region detected in a previous frame to the target frame, and
    (a-2) when the region detected from the target frame is a region subsequent to the region detected in the previous frame, assigning a track ID identical to that of the region corresponding to the previous frame to the region detected from the target frame to obtain track data indicating a consecutive appearance of an identical object; and
  (b) generating trace information indicating which object ID each track ID belongs to, by associating a track ID obtained in the tracking with an object ID for uniquely identifying an object,
    wherein the generating (b)
    on a basis of a coexistence possibility relating to imaging time between a track ID associated with one or more existing object IDs and target track data without an associated object ID, determines which object ID the target track data belongs to,
  wherein
    the tracking includes extracting a feature amount of the region of the object, and
    on a basis of the feature amount of the region of the object in the target frame, a positioning and size of the region, a feature amount of the region of the object in the previous frame, and a position and size of the region, determines whether or not the region in the target frame is a region subsequent to the region detected in the previous frame, and
    associating region information including the position and size of the region of the object in the target frame, the feature amount, and the imaging time with a track ID,
  wherein
    when one existing object ID is defined as a first object ID,
    from among track IDs associated with the first object ID, a track ID with coexistence possibility with a target TRACK without an associated object ID is defined as a first track ID and a track ID without coexistence possibility is defined as a second track ID, and
    for the first track ID, a similarity based on feature amount between a target TRACK without an associated object ID and each track belonging to the first track ID is defined as a similarity between the target TRACK and the first object ID,
    for the second track ID
      obtaining a first similarity between the target track data and track data excluding track data with no coexistence possibility in the second track ID,
      obtaining a second similarity between track data with no coexistence possibility belonging to the second track ID and track data excluding the TRACK,
      setting a similarity between the target track data and the first object ID to 0 when the first similarity is greater than the second similarity,
      setting a similarity between the target track data and track data with coexistence possibility in the second track ID as a similarity between the target track data and the first object ID when the first similarity is equal to or less than the second similarity, and
    determining which object ID the target track data without an associated object ID belongs to from similarities for existing object IDs.

8. A method of controlling an object tracing apparatus that traces an object in a video obtained by an image capturing apparatus, comprising:
  (a) tracking the object in a frame in the video and obtains track data indicating consecutive appearances of the object,
    wherein, the tracking (a) includes
    (a-1) detecting a region of the object in a target frame in the video and assigning a new track ID to the region detected from the target frame when the region is not a region subsequent to a region detected in a previous frame to the target frame, and
    (a-2) when the region detected from the target frame is a region subsequent to the region detected in the previous frame, assigning a track ID identical to that of the region corresponding to the previous frame to the region detected from the target frame to obtain track data indicating a consecutive appearance of an identical object; and
  (b) generating trace information indicating which object ID each track ID belongs to, by associating a track ID obtained in the tracking with an object ID for uniquely identifying an object,
    wherein the generating (b)
    on a basis of a coexistence possibility relating to imaging time between a track ID associated with one or more existing object IDs and target track data without an associated object ID, determines which object ID the target track data belongs to,
  storing information relating to a placement position, optical axis direction, and a field angle of a plurality of image capturing apparatuses,
  tracking in a video from each one of the plurality of image capturing apparatuses, and
  when the information stored indicates that the plurality of image capturing apparatuses have no overlapping fields of view, determining that there is coexistence possibility for track data including identical imaging times in video obtained from each one of the plurality of image capturing apparatuses, and
  when the information stored indicates that the plurality of image capturing apparatuses have overlapping fields of view, determines that there is no coexistence possibility for track data including identical imaging times in video obtained from each one of the plurality of image capturing apparatuses.

9. A non-transitory computer readable storage medium storing a program which, when read and executed by a computer, caused the computer to perform the steps of a method of controlling an object tracing apparatus that traces an object in a video obtained by an image capturing apparatus, the method comprising:
  (a) tracking the object in a frame in the video and obtains track data indicating consecutive appearances of the object,
    wherein, the tracking (a) includes
    (a-1) detecting a region of the object in a target frame in the video and assigning a new track ID to the region detected from the target frame when the region is not a region subsequent to a region detected in a previous frame to the target frame, and (a-2) when the region detected from the target frame is a region subsequent to the region detected in the previous frame, assigning a track ID identical to that of the region corresponding to the previous frame to the region detected from the target frame to obtain track data indicating a consecutive appearance of an identical object; and (b) generating trace information indicating which object ID each track ID belongs to, by associating a track ID obtained in the tracking with an object ID for uniquely identifying an object, wherein the generating (b)

on a basis of a coexistence possibility relating to imaging time between a track ID associated with one or more existing object IDs and target track data without an associated object ID, determines which object ID the target track data belongs to, storing information relating to a placement position, optical axis direction, and a field angle of a plurality of image capturing apparatuses, tracking in a video from each one of the plurality of image capturing apparatuses, and when the information stored indicates that the plurality of image capturing apparatuses have no overlapping fields of view, determining that there is coexistence possibility for track data including identical imaging times in video obtained from each one of the plurality of image capturing apparatuses, and when the information stored indicates that the plurality of image capturing apparatuses have overlapping fields of view, determines that there is no coexistence possibility for track data including identical imaging times in video obtained from each one of the plurality of image capturing apparatuses.

\* \* \* \* \*